US012764715B2

(12) United States Patent
Esswie

(10) Patent No.: US 12,764,715 B2
(45) Date of Patent: Oct. 13, 2026

(54) ENERGY-EFFICIENT PAGING ADAPTATION

(71) Applicant: Dell Products L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 237 days.

(21) Appl. No.: 18/434,186

(22) Filed: Feb. 6, 2024

(65) Prior Publication Data

US 2025/0254652 A1 Aug. 7, 2025

(51) Int. Cl.
*H04W 68/02* (2009.01)
*H04W 52/02* (2009.01)

(52) U.S. Cl.
CPC ....... *H04W 68/02* (2013.01); *H04W 52/0225* (2013.01)

(58) Field of Classification Search
CPC .......................... H04W 68/02; H04W 52/0225
USPC .......................................................... 455/458
See application file for complete search history.

(56) References Cited

U.S. PATENT DOCUMENTS 10,356,749 B2 7/2019 Lee
10,506,552 B2 12/2019 Pantus
10,849,186 B2 * 11/2020 Dao .................... H04L 41/5019
11,277,813 B2 * 3/2022 Yang ....................... H04W 8/08
11,997,647 B2 * 5/2024 Kodaypak ........... H04W 64/006
12,185,276 B2 12/2024 Hsieh
2010/0248750 A1 9/2010 Muller
2012/0147806 A1 6/2012 Akhtar
2015/0057033 A1 * 2/2015 Schliwa-Bertling ......................... H04W 52/0229 455/458

(Continued)

FOREIGN PATENT DOCUMENTS

WO WO-2024170589 A1 * 8/2024 .......... H04W 84/045
WO WO-2025023951 A1 * 1/2025 ............ H04W 68/02

OTHER PUBLICATIONS

Office Action mailed Jan. 12, 2026 for U.S. Appl. No. 18/434,203, 28 pages.

(Continued)

*Primary Examiner* — Jinsong Hu
(74) *Attorney, Agent, or Firm* — Amin, Turocy & Watson, LLP

(57) ABSTRACT

A serving radio network node may configure a user equipment with one or more paging class indications associated with one or more paging classes that may correspond to one or more capabilities corresponding to the user equipment. If the serving node determines to implement a paging modification policy based on a paging modification metric satisfying a paging modification criterion, the serving node may transmit to the user equipment an indication indicative that the serving node is temporarily suspending paging with respect to one or more of the paging classes. The user equipment may monitor a paging occasion corresponding to a node neighboring the serving node. If the user equipment detects, during a paging occasion corresponding to the neighboring node, a paging message corresponding to a suspended paging class, the user equipment may establish a connection with either the serving node or the neighboring node based on a configured indication.

20 Claims, 18 Drawing Sheets

600

(56) References Cited

U.S. PATENT DOCUMENTS

| | | | | |
|---|---|---|---|---|
| 2016/0081025 | A1* | 3/2016 | Deng | H04W 52/0225 370/311 |
| 2017/0164326 | A1 | 6/2017 | Worrall | |
| 2018/0270756 | A1* | 9/2018 | Bhattad | H04W 76/27 |
| 2019/0082417 | A1* | 3/2019 | Bolle | H04W 76/27 |
| 2020/0163049 | A1* | 5/2020 | Lau | H04W 68/02 |
| 2021/0337506 | A1 | 10/2021 | Fiorani | |
| 2022/0159669 | A1 | 5/2022 | Kim | |
| 2022/0201651 | A1 | 6/2022 | Martin | |
| 2022/0279479 | A1 | 9/2022 | Nader | |
| 2023/0209505 | A1* | 6/2023 | Kodaypak | H04W 68/02 455/458 |
| 2023/0300791 | A1 | 9/2023 | Dai | |
| 2023/0337186 | A1* | 10/2023 | Toskala | H04W 68/12 |
| 2024/0121755 | A1 | 4/2024 | Dong | |
| 2024/0155559 | A1* | 5/2024 | Nader | H04W 68/02 |
| 2024/0155562 | A1* | 5/2024 | Kim | H04W 68/02 |
| 2024/0422684 | A1* | 12/2024 | Maleki | H04W 52/0216 |
| 2025/0254653 | A1 | 8/2025 | Esswie | |

OTHER PUBLICATIONS

Notice of Allowance mailed May 7, 2026 for U.S. Appl. No. 18/434,203, 39 pages.

* cited by examiner

| | Device and/or service paging class configurations |
|---|---|
| 305 | One or more paging occasion (in terms of the frequency and timing resources) per each radio frame |
| 310 | One or more device or service class IDs for which paging indications will be broadcasted over the paging occasion |
| 315 | Periodicity of the paging occasion |
| 320 | New connection establishment accepted for halted paging classes |

220

FIG. 3

ENERGY-EFFICIENT PAGING ADAPTATION

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise determining, by a radio network node comprising at least one processor, a paging modification parameter metric to result in a determined paging modification parameter metric and analyzing, by the radio network node, the determined paging modification parameter metric with respect to a paging modification parameter criterion to result in an analyzed determined paging modification parameter metric. Based on satisfaction of the paging modification parameter criterion by the analyzed determined paging modification parameter metric, the method may further comprise facilitating, by the radio network node, transmitting, to at least one user equipment, a paging modification indication indicative that the radio network node is implementing a modified paging policy with respect to the at least one user equipment or with respect to at least one paging class corresponding to the user equipment.

In an embodiment, the at least one user equipment may be part of at least one group of user equipment corresponding to at least one paging class. The modified paging policy may be implemented with respect to the at least one user equipment corresponding to the at least one paging class.

The method may further comprise facilitating, by the radio network node, transmitting, to the at least one user equipment, a paging class configuration comprising paging resource monitoring information, corresponding to the at least one paging class, usable by the at least one user equipment to monitor paging resources with respect to the radio network node during a modified paging policy period. The paging resource monitoring information comprises at least one of: at least one paging occasion frequency resource and at least one paging timing resource associated with the at least one paging occasion frequency resource; at least one device class identifier indicative of at least one device classification with respect to which paging messages are able to be broadcast via the at least one paging occasion frequency resource and the at least one paging timing resource; at least one service class identifier indicative of at least one service level classification with respect to which the paging messages are able to be broadcast via the at least one paging occasion frequency resource and the at least one paging timing resource; at least one subscription level identifier indicative of at least one subscription level classification with respect to which the paging messages are able to be broadcast via the at least one paging occasion frequency resource and the at least one paging timing resource; or a periodicity associated with the at least one paging occasion frequency resource or the at least one paging timing resource.

In an embodiment, the at least one user equipment may be part of the at least one group of user equipment corresponding to the at least one paging class based on at least one of: a capability corresponding to the at least one user equipment, a services subscription level corresponding to the at least one user equipment, a first quality-of-service associated with the at least one user equipment; or a second quality-of-service associated with the capability corresponding to the at least one user equipment.

In an embodiment, the modified paging policy may comprise interruption of paging with respect to the at least one user equipment.

In an embodiment, the method may further comprise, according to the modified paging policy, avoiding, by the radio network node, accepting connection establishment with respect to the at least one user equipment.

In an embodiment, the radio network node may be a first radio network node, and the method may further comprise facilitating, by the first radio network node, connection establishment with respect to the at least one user equipment, wherein a connection establishment message, corresponding to the at least one user equipment, is received from a second radio network node.

In an embodiment, the method may further comprise facilitating, by the first radio network node, transmitting, via at least one backhaul communication link to a network equipment, a connection establishment indication indicative that the first radio network node has established a connection with the at least one user equipment based on a paging message transmitted by the second radio network node.

In an embodiment, the first radio network node may be associated with a first signal strength with respect to the at least one user equipment. The second radio network node may be associated with a second signal strength with respect to the at least one user equipment that is lower than the first signal strength.

In an embodiment, the paging modification parameter metric may be at least one of: a resource utilization, an energy consumption, or a false paging rate.

In an embodiment, the method may further comprise facilitating, by the radio network node, receiving, from a network equipment, a paging modification parameter criterion configuration comprising the paging modification parameter criterion.

In another example embodiment, a radio network node may comprise at least one processor configured to process executable instructions that, when executed by the at least one processor, facilitate performance of operations that may comprise determining a paging interruption parameter metric to result in a determined paging interruption parameter metric and analyzing the determined paging interruption parameter metric with respect to a paging interruption parameter criterion to result in an analyzed determined paging interruption parameter metric. Based on determining the paging interruption parameter criterion is satisfied by the analyzed determined paging interruption parameter metric, the method may further comprise transmitting, to at least one user equipment associated with a paging class, a paging interruption indication indicative that the radio network node is interrupting paging, with respect to the at least one user equipment associated with the paging class, and indicative of at least one paging interruption period during which paging is to be interrupted with respect to the paging class.

The operations may further comprise avoiding, during the at least one paging interruption period, accepting connection establishment with respect to the at least one user equipment associated with the paging class.

In an embodiment, the radio network node may be a first radio network node. The operations may further comprise facilitating connection establishment with respect to at least one of the at least one user equipment associated with the paging class, wherein a connection establishment message corresponding to the at least one user equipment of the at least on user equipment associated with the paging class is received from a second radio network node, wherein the at least one of the at least one user equipment associated with the paging class received, from the second radio network node, a paging message during the at least one paging interruption period, and wherein the connection establishment message is responsive to the paging message. The operations may further comprise facilitating transmitting, via at least one backhaul communication link to a network equipment, a connection establishment indication indicative that the first radio network node has established a connection with the at least one user equipment based on the paging message and indicative that paging escalation, with respect to paging the at least one of the at least one user equipment associated with the paging class, is to be halted. The first radio network node may be associated with a first signal strength with respect to the at least one user equipment. The second radio network node may be associated with a second signal strength with respect to the at least one user equipment. The second signal strength is lower than the first signal strength.

In yet another example embodiment, a non-transitory machine-readable medium may comprise executable instructions that, when executed by at least one processor of a radio network node, facilitate performance of operations that may comprise transmitting, to at least one user equipment, a paging class assignment configuration comprising at least one paging class identifier indictive of at least one paging class associated with the at least one user equipment and transmitting, to the at least one user equipment associated with the at least one paging class, a paging class configuration comprising paging resource monitoring information, corresponding to the at least one paging class, usable by the at least one user equipment to monitor paging resources. The operations may further comprise determining a paging modification parameter metric to result in a determined paging modification parameter metric and analyzing the determined paging modification parameter metric with respect to a paging modification parameter criterion to result in an analyzed determined paging modification parameter metric. Based on the paging modification parameter criterion being determined to be satisfied by the analyzed determined paging modification parameter metric, the operations may further comprise broadcasting a paging modification indication, directed to the paging class, indicative that the radio network node is modifying paging, with respect to user equipment associated with the at least one paging class, and indicative of at least one paging modification period during which paging is to be modified with respect to the paging class. The modifying of the paging with respect to the at least one paging class comprises deactivating paging according to a first paging process and activating paging according to a second paging process that corresponds to the paging class configuration.

The paging resource monitoring information may comprise at least one of: at least one paging occasion frequency resource and at least one paging timing resource associated with the at least one paging occasion frequency resource, at least one device class identifier indicative of at least one device classification with respect to which paging messages are able to be broadcast via the at least one paging occasion frequency resource and the at least one paging timing resource, at least one service class identifier indicative of at least one service level classification with respect to which the paging messages are able to be broadcast via the at least one paging occasion frequency resource and the at least one paging timing resource, at least one subscription level identifier indicative of at least one subscription level classification with respect to which the paging messages are able to be broadcast via the at least one paging occasion frequency resource and the at least one paging timing resource, a first periodicity associated with the at least one paging occasion frequency resource, or a second periodicity associated with the at least one paging timing resource.

In an embodiment, the at least one paging class may be based on at least one of: a capability corresponding to the at least one user equipment, a services subscription level corresponding to the at least one user equipment, a first Quality-of-Service associated with the at least one user equipment, or a second Quality-of-Service associated with the capability corresponding to the at least one user equipment.

In an embodiment, the radio network node may be a first radio network node, wherein the first paging process comprises deactivating paging with respect to the at least one paging class during the at least one paging modification period, wherein the second paging process comprises facilitating connection establishment with respect to the paging class in response to paging messages broadcast by another radio network node, other than the first radio network node, during the at least one paging modification period. The operations may further comprise receiving, from a second radio network node, a connection establishment message based on a paging message received by the at least one user equipment from the second radio network node during the at least one paging modification period; and responsive to the connection establishment message, initiating establishment of a communication session with the at least one user equipment.

Another example method may comprise receiving, by a user equipment comprising at least one processor from a radio network node, a paging class assignment configuration, comprising at least one paging class identifier indictive of at least one paging class associated with the user equipment. The method may further comprise receiving, by the user equipment from the radio network node, a paging class configuration comprising paging resource monitoring information, corresponding to the at least one paging class associated with the user equipment, usable by the user equipment to monitor at least one paging resource during at least one modified paging policy period. The method may further comprise determining, by the user equipment, that the radio network node is implementing a modified paging policy with respect to the at least one paging class associated with the user equipment to result in a determined modified paging policy and, responsive to determining the determined modified paging policy, monitoring at least one paging resource according to the paging resource monitoring information.

The paging resource monitoring information, corresponding to the at least one paging class, may be usable by the user equipment to monitor paging resources with respect to the radio network node during the at least one modified paging policy period. The paging resource monitoring information may comprise at least one of: at least one paging occasion frequency resource and at least one paging timing resource associated with the at least one paging occasion frequency resource; at least one device class identifier indicative of at least one device classification with respect to which paging messages are able to be broadcast via the at least one paging occasion frequency resource and the at least one paging timing resource; at least one service class identifier indicative of at least one service level classification with respect to which the paging messages are able to be broadcast via the at least one paging occasion frequency resource and the at least one paging timing resource; at least one subscription level identifier indicative of at least one subscription level classification with respect to which the paging messages are able to be broadcast via the at least one paging occasion frequency resource and the at least one paging timing resource; or a periodicity associated with the at least one paging occasion frequency resource or the at least one paging timing resource.

In an embodiment, the determining of the determined modified paging policy may comprise receiving, from the radio network node, a paging interruption indication indicative that the radio network node is implementing the modified paging policy with respect to the user equipment, wherein the modified paging policy comprises deactivating paging with respect to the at least one paging class.

In an embodiment, the radio network node may be a first radio network node. The first radio network node may be associated with a first signal strength with respect to the user equipment. The method may further comprise selecting, by the user equipment, a second radio network node associated with a second signal strength with respect to the user equipment that is lower than the first signal strength and receiving, by the user equipment from the second radio network node, a paging message directed to the user equipment.

In an embodiment, the method may further comprise, responsive to the paging message directed to the user equipment and received from the second radio network node, selecting the first radio network node and initiating, by the user equipment, a process to establish a communication session with the first radio network node.

In an embodiment, the method may further comprise, responsive to the paging message directed to the user equipment, initiating, by the user equipment, a process to establish a communication session with the second radio network node.

In an embodiment, the selecting of the second radio network node may comprise determining that the second radio network node is configured to facilitate, during the at least one modified paging policy period, paging with respect to the at least one paging class associated with the user equipment.

The user equipment may be associated with the at least one paging class based on at least one of: a capability corresponding to the user equipment, a services subscription level corresponding to the user equipment, a first quality-of-service associated with the user equipment, or a second quality-of-service associated with the capability corresponding to the user equipment.

The at least one paging class identifier may comprise a first paging class identifier indictive of a first paging class associated with the user equipment. The at least one paging class identifier may comprise a second paging class identifier indictive of a second paging class associated with the user equipment. The determined modified paging policy may comprise deactivating paging with respect to the first paging class. The determined modified paging policy comprises actively paging with respect to the second paging class.

In an embodiment, the radio network node may be a first radio network node. The method may further comprise monitoring, by the user equipment with respect to the first paging class during the at least on modified paging policy period, at least one paging resource corresponding to a second radio network node and monitoring, by the user equipment with respect to the second paging class during the at least one modified paging policy period, at least one paging resource corresponding to the first radio network node.

In yet another example embodiment, a user equipment may comprise at least one processor configured to process executable instructions that, when executed by the at least one processor, facilitate performance of operations that may comprise receiving, from a radio network node, a paging class assignment configuration, comprising at least one paging class identifier indictive of at least one paging class associated with the user equipment. The operations may further comprise receiving a paging class configuration comprising paging resource monitoring information, corresponding to the at least one paging class, usable by the user equipment to monitor at least one paging resource during at least one modified paging policy period. The method may further comprise receiving, from the radio network node, a paging modification indication indicative that the radio network node is to implement a modified paging policy, with respect to the at least one paging class, during the at least one modified paging policy period. Responsive to the paging modification indication, the operations may further comprise monitoring at least one paging resource according to the paging resource monitoring information.

In an embodiment, the at least one paging resource may correspond to the radio network node.

In an embodiment, the radio network node may be a first radio network node. The modified paging policy may comprise interrupting, during at least one of the at least one modified paging policy period, paging with respect to the user equipment. The at least one paging resource may correspond to a second radio network node that is facilitating paging with respect to the at least one paging class during the at least one modified paging policy period.

In an embodiment, the first radio network node may be associated with a first signal strength with respect to the user equipment. The second radio network node may be associated with a second signal strength with respect to the user equipment that is lower than the first signal strength. The operations may further comprise selecting the second radio network node and receiving, from the second radio network node, a paging message directed to the user equipment.

In an embodiment, the operations may further comprise responsive to the paging message directed to the user equipment, establishing a communication session with the second radio network node.

In an embodiment, the operations may further comprise, responsive to the paging message directed to the user equipment and received from the second radio network node, selecting the first radio network node and establishing a communication session with the first radio network node.

In another example embodiment, a non-transitory machine-readable medium may comprise executable instructions that, when executed by at least one processor of a user equipment, facilitate performance of operations that may comprise receiving a paging class configuration comprising paging resource monitoring information, corresponding to at least one paging class, usable by the user equipment to monitor at least one paging resource during at least one modified paging policy period. The operations may further comprise receiving, from the radio network node, a paging modification indication indicative that the radio network node is to implement a modified paging policy, with respect to the at least one paging class, during the at least one modified paging policy period. Responsive to the paging modification indication, the operations may further comprise monitoring at least one paging resource according to the paging resource monitoring information.

In an embodiment, the paging class configuration may comprise first paging resource monitoring information corresponding to a first paging class of the at least one paging class and second paging resource monitoring information corresponding to a second paging class of the at least one paging class. The paging modification indication may be indicative that the radio network node is to implement a modified paging policy with respect to the first paging class during the at least one modified paging policy period. The paging modification indication may be indicative that the radio network node is to implement an unmodified paging policy with respect to the second paging class during the at least one modified paging policy period. The monitoring of the at least one paging resource according to the paging resource monitoring information may comprises monitoring at least one first paging resource indicated by the first paging resource monitoring information during the at least one modified paging policy period for at least one first paging message corresponding to the first paging class and monitoring at least one second paging resource indicated by the second paging resource monitoring information during the at least one modified paging policy period for at least one second paging message corresponding to the second paging class.

The radio network node may be a first radio network node. The at least one first paging resource may correspond to a second radio network node. The at least one second paging resource may correspond to the first radio network node.

In an embodiment, the operations may further comprise receiving, from the second radio network node, a paging message according to the at least one first paging resource during the at least one modified paging policy period and responsive to the receiving of the paging message from the second radio network node, establishing a connection with the first radio network node enabling the user equipment and the first radio network node to communicate.

BRIEF DESCRIPTION OF THE DRAWINGS

FIG. 3 illustrates an example paging class configuration.

DETAILED DESCRIPTION

Figure 1:
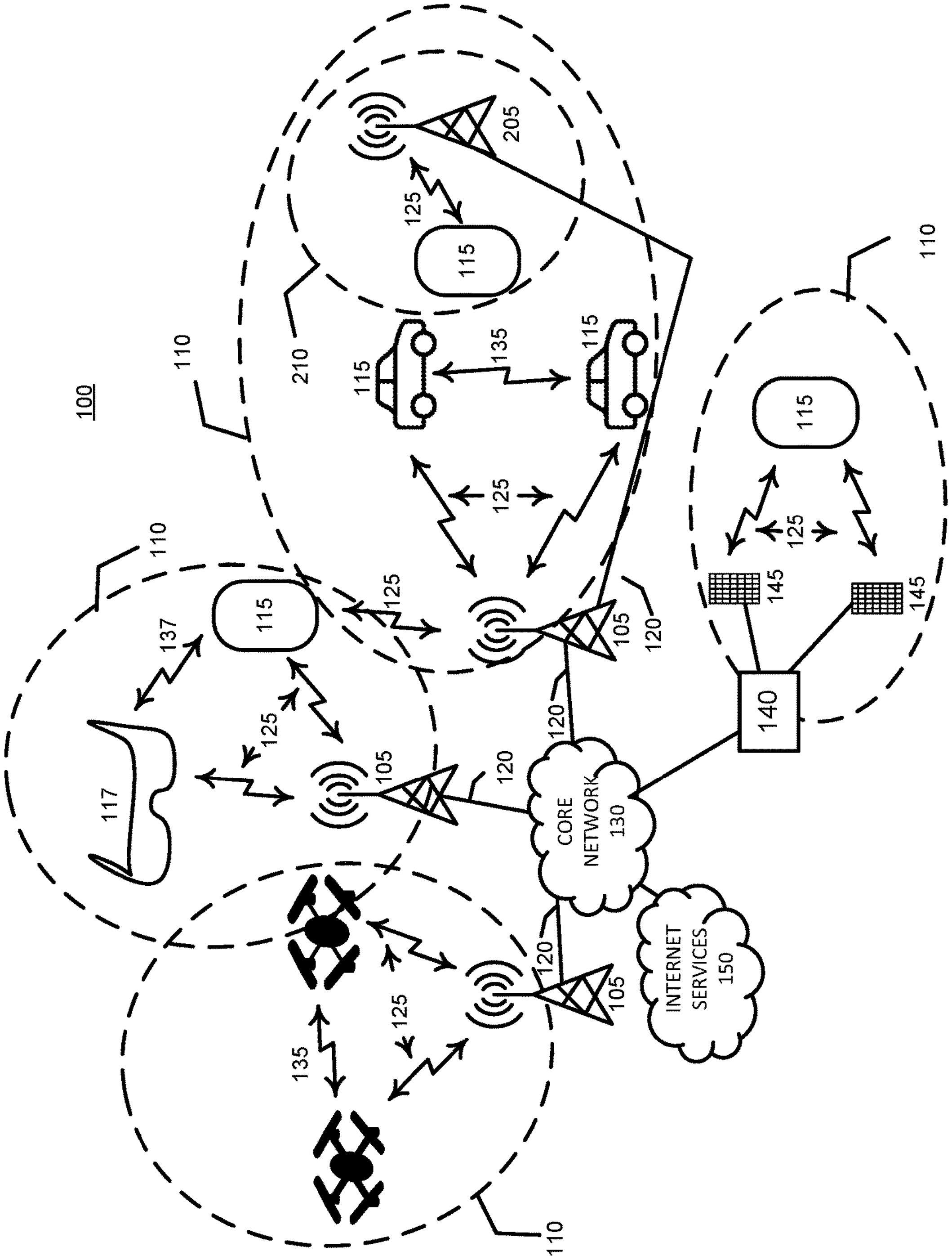
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 17.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

User equipment operating in idle mode or inactive mode typically is/are in a state of deep sleep (e.g., transceiver chains are inactive) as long as there is not incoming traffic or services for the user equipment. However, to facilitate an idle/inactive user equipment becoming aware of incoming downlink payload, the user equipment is typically configured with a set of periodic paging occasions within certain radio frames during which the user equipment is to wake up, monitor, and determine if there is a paging indication directed to the UE. For example, in RRC IDLE mode or RRC INACTIVE mode, a user equipment may wake up according to a configured paging cycle configuration to determine whether the user equipment is being paged during the current paging occasion. According to conventional techniques, to transition to an RRC CONNECTED state and receive a paging message, a user equipment may attempt re-synchronizing with a NR RAN node radio interface by detecting at least a single synchronization signal block ("SSB"), since a UE may not be synchronized with the radio interface due to a long sleep/inactive transceiver period. Different UEs, with different implementations (e.g., UEs supplied from different vendors or configured for different applications or purposes) may require a different number of SSBs/radio sequences to synchronize with the RAN node. For example, a user equipment experiencing good signal-to-interference-noise-ratio ("SINR") conditions with a RAN node may be able to re-synchronize with the node by detecting a single SSB/sequence whereas a UE experiencing poor SINR conditions may require additional SSB detection attempts. After a UE is synchronized with a RAN node, the UE may attempt to blindly decode a paging downlink control information ("DCI") message transmitted by the RAN node via a possible physical downlink control channel occasion. Blind decoding is a power-consuming operation because a user equipment is not yet connected to the network, and thus, being unaware of paging transmission configuration information, such as, for example, a modulation and coding scheme, the UE typically attempts blind decoding according to multiple, or all, possible encodings with respect to the paging DCI message. The paging DCI message may indicate to an idle/inactive UE that there is at least a single UE with incoming traffic in the downlink direction. In case there is no paging DCI detected via the PDCCH resources, an idle/inactive UE may assume that there is no paging being conveyed via a current paging opportunity, and thus the UE may continue sleeping until waking up at a next configured paging occasion. If an idle/inactive UE detects the presence of a paging DCI during a configured paging occasion the UE may decode a corresponding subsequent physical downlink shared channel data resource to read a paging record/paging message. The paging record/message may indicate one or more identifier(s) corresponding to one or more idle/inactive UE(s) that is/are being paged. From the perspective of a user equipment, if a paging record contains a temporary identifier corresponding to the user equipment, the user equipment may trigger a random-access procedure with respect to a RAN node that transmitted the DCI to facilitate transitioning to an RRC CONNECTED state.

According to conventional techniques, one or more tradeoffs may be implemented to achieve a desired level of paging performance, including increasing number/frequency of paging occasion occurrences and paging DCIs to result in less packet buffering delay and minimized device reachability delay. However, to facilitate an increased number of paging occasion occurrences, a user equipment wakes up more often thus negatively impacting battery consumption performance at the user equipment. In addition, more frequent paging DCI messages results in a larger size of a physical downlink control channel set ("CORESET"), and thus less remaining PDCCH resources usable for other control and scheduling information and less overall bandwidth part data resources usable for data transmissions via a physical downlink shared channel.

Although paging in general may facilitate reasonable idle mode and access performance, paging is considered as a network-energy-inefficient operation. Paging facilitates a RAN node, with respect to which one or more user equipment may have been last connected, to reach a certain device (e.g., when triggered by core network equipment to facilitate receiving an incoming voice call) by broadcasting a paging indication, which may be referred to as a paging message, that indicates an identifier associated with one or more to-be-paged user equipment. The broadcast paging indication may indicate transmission of a downlink control channel, indicative of a scheduled paging data channel, via which one or more paging indications associated with the one or more user equipment are transmitted. Since the RAN node is not aware of where a paged idle mode user equipment is located, paging indications/messages may be broadcast via each of one or more active downlink beams corresponding to the RAN node. Accordingly, in case a paged device does not respond to a transmitted paging indication/request (e.g., due to device mobility a user equipment is located beyond a coverage range corresponding to the RAN node that the user equipment was last connected to), the RAN node may implement paging escalation, wherein the same paging indication already broadcast to the user equipment may be broadcast from neighboring tier-1 RAN nodes (e.g., neighboring with respect to the RAN node to which a user equipment was last connected). Paging escalation leads to a significant energy consumption by the RAN node and the neighboring RAN nodes, especially when escalation is frequently implemented.

Conventional techniques to reduce energy consumed for paging mainly rely on relaxing paging resource periodicity and reducing a size of a frequency resource usable to facilitate delivery of potential paging indications. Thus, despite reducing energy used for paging, such relaxation of periodicity and frequency resource size degrades paging performance and reduces paging capacity (e.g., a number of user equipment that can be substantially simultaneously paged by a RAN node during a paging resource occasion is reduced). Accordingly, it is desirable to reduce energy consumption corresponding to fundamental paging procedures while delivering reasonable paging and access performance, which may be more stringent for delivery of stringent traffic, with respect to an idle mode user equipment.

Embodiments disclosed herein may facilitate service-specific paging with adaptive and energy-consumption-triggered temporary paging interruption according to one or paging classes. According to embodiments disclosed herein, paging resources may be setup and allocated based on one or more predefined service classes or based on one or more user equipment device classes instead being allocated for each idle mode device, or for each of one or more user equipment is a device group, or device set. Using flexibility and controllability facilitated by embodiments disclosed herein, a radio network node may dynamically determine one or more service classes or one or more device classes with respect to which temporary halting/interruption of paging is to be implemented upon detecting an energy consumption problem or upon satisfying a preset energy consumption criterion/threshold for activating paging relaxation without impacting paging and access performance with respect to user equipment associated with stringent traffic or purposes that may correspond to other classes for which paging is not to be temporarily halted/interrupted. Accordingly, a RAN node may temporarily relax paging, and thus decrease paging performance, only with respect to non-stringent service classes or non-stringent device classes, (e.g., paging may be temporarily interrupted for non-'VIP' devices with respect to conventional, non-emergency calls).

According to embodiments disclosed herein, RAN nodes may dynamically adapt paging signaling and energy consumption loading, based on real-time resource congestion and power consumption conditions. A RAN node may associate paging resources with predefined devices classes or predefined service classes and according may dynamically temporarily halt broadcasting paging for certain service or device classes, regardless of how many devices may be otherwise paged for a given class. Thus, according to embodiments disclosed herein, significant network energy saving gains may be realized.

To minimize impact on idle mode user equipment devices, with respect to which a RAN node may have interrupted, or modified, paging, embodiments disclosed herein may facilitate a user equipment in idle mode or inactive mode determining that broadcast of paging messages has been halted for one or more of services supported by the user equipment. Based on determining that a serving RAN node has halted/interrupted/suspended/modified paging with respect to a user equipment class or service class corresponding to a service or application supported by the user equipment, the user equipment may trigger selection or re-selection towards any 'visible' adjacent RAN node (e.g., a node with respect to which the user equipment can detect a signal strength corresponding to usable wireless communication service) that has not halted, or otherwise modified paging according to one or more paging classes for which the serving node suspended paging. Thus, a temporary cell re-selection may be triggered based on paging availability rather than based on coverage/signal strength. An idle mode user equipment may thus conventionally monitor paging resources associated with a paging class, with respect to which the serving RAN node modified paging, via the re-selected RAN node. On condition of detecting a paging indication/message directed to the user equipment, in an embodiment the user equipment may attempt connection establishment with the re-selected cell/RAN node from which the paging indication is received.

In another embodiment, and if configured by the primary/first RAN node, when detecting a paging indication/message directed to the user equipment, the user equipment may trigger a second cell re-selection back to the original serving RAN node, and may attempt connection establishment therewith, (e.g., the user equipment may attempt connection establishment with a RAN node that has not paged the user equipment). Thus, according to the embodiment, an idle mode user equipment may be able to always connect to a RAN node that delivers the best received coverage, even with a RAN node that has interrupted, halted, or otherwise modified paging with respect to a paging class corresponding to the idle mode user equipment. Accordingly, a user equipment may receive a paging indication/message from a coverage-suboptimal RAN node but, based on a received paging indication/message, may access a RAN node providing a best coverage/signal strength to facilitate connection establishment. Thus, a RAN node may be able to increase energy saving gains by modifying paging policies with respect to one or more paging classes corresponding to non VIP/non-stringent services/devices while not materially impacting idle mode device paging performance.

Energy Efficient Paging Adaptation.

Figure 2:
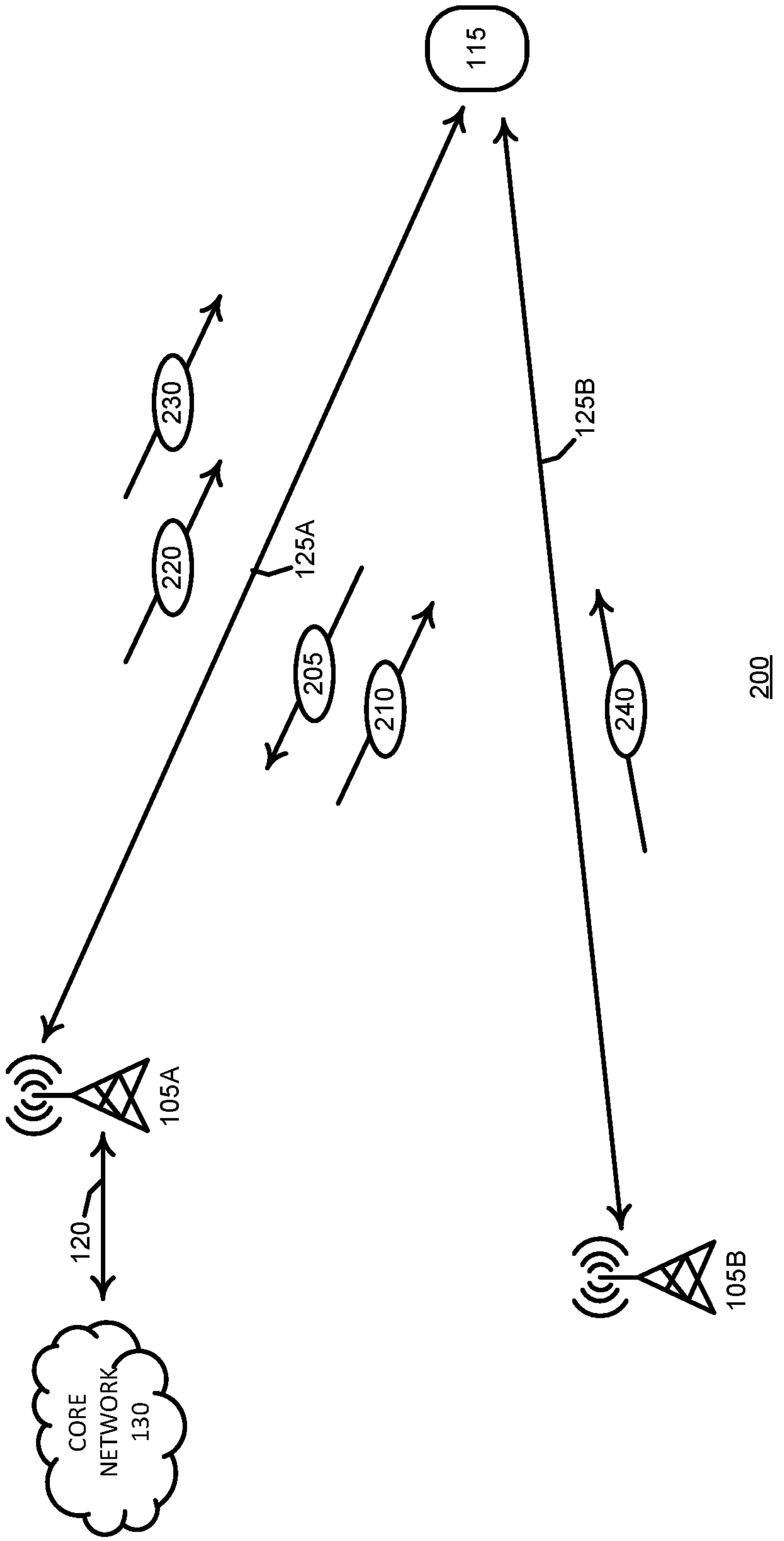
FIG. 2 illustrates an example environment with a radio network node implementing a modified a paging policy.

Turning now to FIG. 2, RAN node 105A may transmit a paging device or service class configuration 210 towards user equipment 115 during a connection establishment procedure with the user equipment procedure in response to receiving device capability and traffic information 205. Capability information or traffic information 205 may comprise information indicative of a capability corresponding to a user equipment, for example, an antenna configuration, a processor capability, applications configured to execute on the user equipment or a subscription level. Traffic information may comprise a quality of service corresponding to traffic that may be facilitated by, transmitted by, or transmitted to the user equipment.

Configuration information 210 may comprise a paging device and/or class identifier, indicative of one or more paging classes with respect to which a radio network node that transmitted configuration 210 may modify a paging policy during future configured paging resource occasions. Configuration information 210 may be semi-static in nature insofar as a device paging class identifier or a service paging class identifier can be assigned to the device by a RAN node (e.g., a first connected RAN node corresponding to a given radio access network). A user equipment may adopt configuration information 210 for use in detecting future paging indications broadcast by a different cell/RAN node corresponding to the same network, or network operator that RAN node 105A may be associated with.

RAN node 105A may broadcast service/device class-based paging class configuration 220 that may comprise indication(s), as shown in FIG. 3, of one or more paging occasions 305, which may be indicated in terms of frequency and timing resources, per each radio frame. Paging class configuration 220 may comprise one or more device class identifiers or service class identifiers 310, which may be used to facilitate paging indications/message being broadcast. Paging class configuration 220 may comprise periodicity information 315 corresponding to the of paging occasions indicated in field 305. Unlike conventional paging techniques, where paging resources are associated with a particular user equipment or particular user equipment group, embodiment disclosed herein may associate certain paging resources with specific service classes, for which paging may be indicated for one or more devices, or with specific device classes, which may correspond to a subscription level, a device requirement, or a device capability, and the like. Indication 220 may comprise a new connection establishment indication 320, which may be a binary indication, that may be indicative of whether RAN node 105A is accepting new connection establishment with respect to user equipment that were paged according to a paging class that RAN node 105A indicated in field 310 as being interrupted, modified, or otherwise not supported, at least with respect to UE 115. Indication 320 may facilitate user equipment 115 that is operating in an idle mode and that is paged by RAN node 105B with respect to a paging class, paging of which is indicated in field 320 as being interrupted/modified/unsupported determining, whether the user equipment can attempt connection establishment with RAN node 105A if a paging message is received from another RAN node (e.g., RAN node 105B) that is adjacent, or nearby, RAN node 105A.

Based on configuration information received from network equipment, for example equipment corresponding to core network 130, RAN node 105A may monitor and determine real-time one or more paging modification parameter metrics, for example resource utilization, energy consumption level, or rate of false paging instants, during a configured period and analyze the determined resource utilization, energy consumption, or false positive rate, with respect to a configured paging modification parameter criterion, or configured paging modification parameter criteria. On condition of a determined paging modification parameter metric satisfying a configured paging modification parameter criterion, for example, a paging modification parameter, such as, for example, an energy consumption amount exceeding a configured modification parameter criterion threshold or limit, RAN node 105A may determine and select one or more device paging classes or service paging classes for which paging is to be temporarily interrupted, halted, or otherwise modified.

Figure 4:
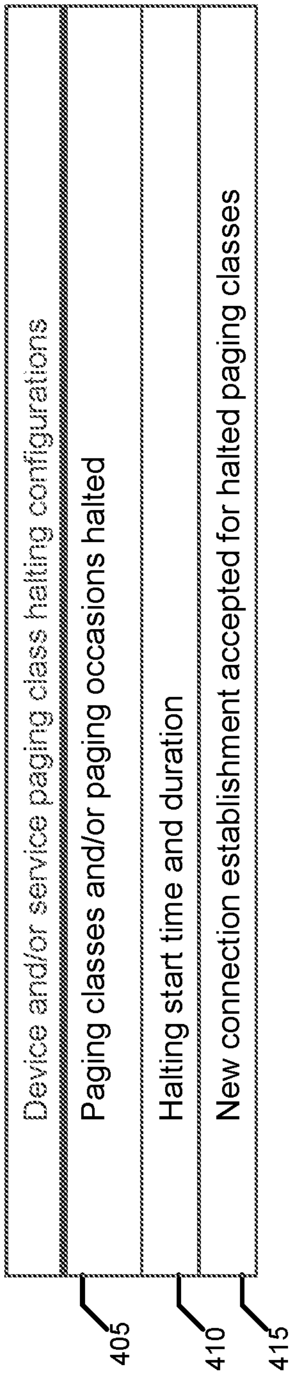
FIG. 4 illustrates an example paging modification indication.

RAN node 105A may transmit or broadcast an updated device/device class paging configuration 230, which may be referred to as a paging modification indication, indicating the shutdown/halting/modification of paging with respect to one or more paging classes 405 (shown in FIG. 4) or a paging halting/paging modification period indication 410, which period may be referred to as a paging modification period or a paging interruption period. Indication 230 may comprise a new connection establishment indication 415, which may be a binary indication, that may be indicative of whether RAN node 105A is accepting new connection establishment with respect to user equipment that were paged according to a paging class that RAN node 105A indicated in field 405 as being interrupted, modified, or otherwise not supported. Indication 415 may facilitate user equipment 115 that is operating in an idle mode and that is paged by RAN node 105B with respect to a paging class, paging of which is indicated in field 405 as being interrupted/modified/unsupported, determining whether the user equipment can attempt connection establishment with RAN node 105A if a paging message is received from another RAN node (e.g., RAN node 105B) that is adjacent, or nearby, RAN node 105.

Thus, RAN node 105A may halt broadcasting of paging indications that are directed to user equipment 115 according to certain service classes or device classes indicated in field 405, and the user equipment may receive, or fetch, paging indications/messages from nearby RAN node 105B instead, while RAN node 105A may still accept/facilitate establishment of new connections from user equipment 115 if the user equipment is actually paged. This embodiment may facilitate a RAN node (e.g., RAN node 105A) that has been selected by a user equipment, but that implements an energy saving mode by deactivating paging with respect to certain paging classes and that may provide a best signal strength/coverage via link 125A with respect to a user equipment that is paged by another RAN according to the deactivated paging class(es) (e.g., UE 115 receives a paging message 240 from RAN node 105B corresponding to link 125B, which may provide a weaker signal strength that link 125A with respect to UE 115), establish connection with the user equipment. Therefore, a RAN node may accept a new connection establishment request from a user equipment to which the RAN node did not broadcast a paging indication/message, and paging detection corresponding to the user equipment may be indicated via backhaul communication links towards equipment of core network 130 (e.g., an access and mobility function). Accordingly, RAN nodes corresponding to various energy consumption capabilities and/or conditions may hand-off paging and cell access performance for certain services or device classes.

In an embodiment, RAN node 105A may deactivate/halt paging for certain paging classes (e.g., certain device classes or certain services classes) while facilitating user equipment 115, corresponding to the certain paging classes, establish connection with RAN node 105A when the user equipment receives a paging message from RAN node 105B. RAN node 105A may halt paging with respect to UE 115, or with respect to a paging class corresponding thereto, but may facilitate continued ability for the UE to access or connect to RAN node 105A, and may interrupt, via backhaul communication links 120, paging escalation by equipment of core network 130 by indicating that a paging message 240 has reached UE 115. Accordingly, a RAN node may handle and control after-paging signaling with respect to a user equipment that the RAN node has not actually paged.

Figure 5A:
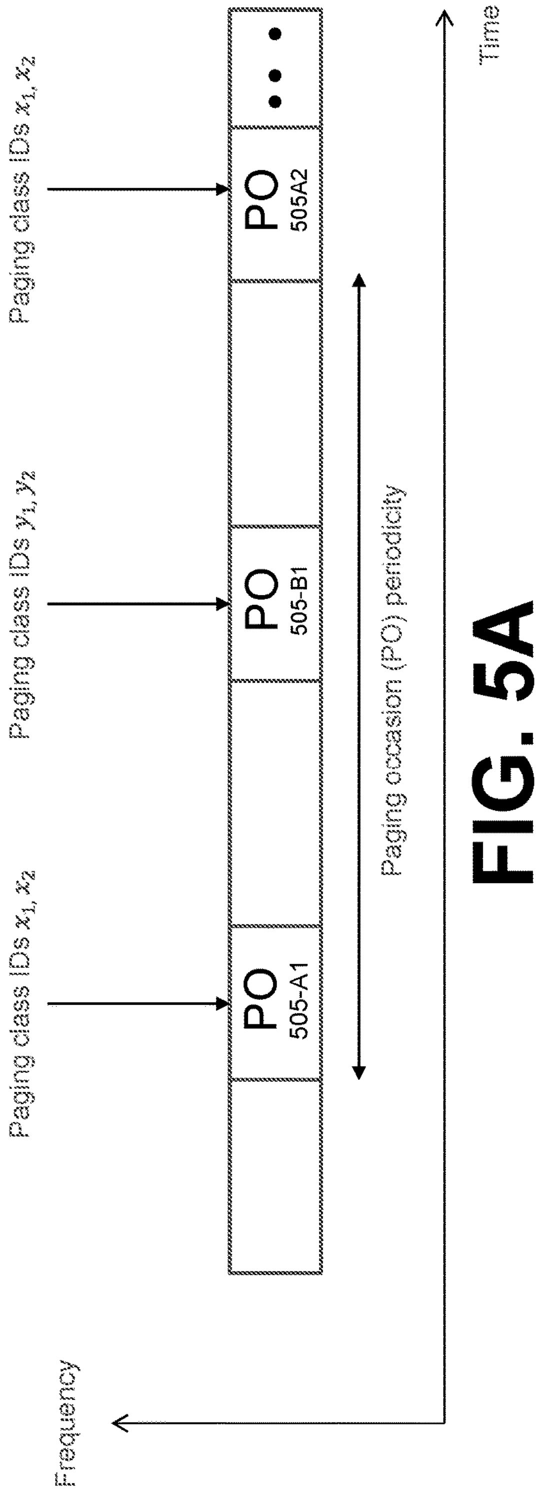
FIG. 5A illustrates example paging resource occasions corresponding to difference paging classes.
Figure 5B:
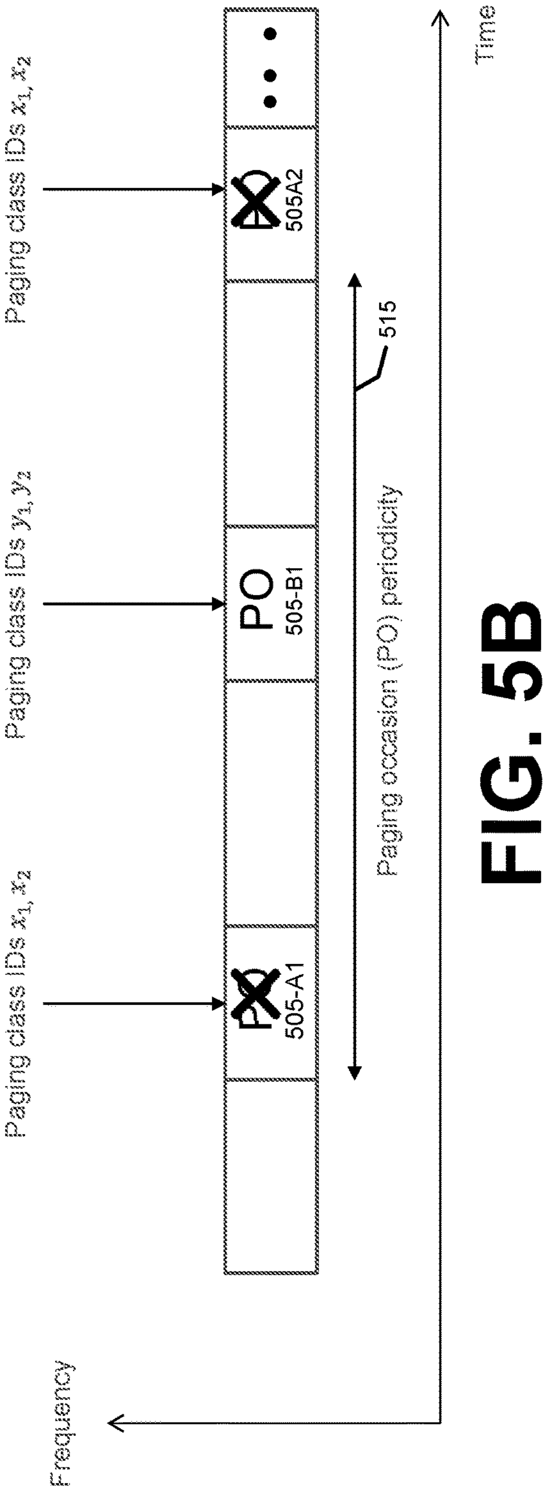
FIG. 5B illustrates example paging resource occasions being deactivated with respect to user equipment associated with certain paging classes.

Turning now to FIG. 5A, a RAN node may have configured user equipment to monitor paging resource occasions 505-A with respect to paging classes $x_1$ and $x_2$ and paging resource occasions 505-B with respect to paging classes $y_1$ and $y_2$ via a paging class configuration 220. As shown in FIG. 5B, a RAN node may have broadcast an updated device/device class paging configurations (e.g., a paging modification indication 230 shown in FIG. 4), indicating shutdown/halting of paging with respect to one or more paging classes and/or one or more respective modified paging periods (e.g., paging for paging classes $x_1$ and $x_2$ is interrupted during paging occasions 505A during a modified paging period, which is shown in FIG. 5B as spanning at least two paging occasion periods 515). A serving RAN node may broadcast a binary indication 320/415 indicative of whether the RAN node is accepting new connection establishment of user equipment paged according to classes $x_1$ and $x_2$ by another RAN node. Indication 320/415 may indicate to idle mode user equipment that receive a paging message broadcast with respect to paging classes $x_1$ and $x_2$ during modified/interrupted paging occasions 505A from a different RAN node (e.g., user equipment corresponding to paging classes that are being halted) whether the user equipment can attempt connection establishment with the serving RAN node.

On-Demand Paging Acquisition.

According to conventional techniques, idle mode user equipment respond to a paging request/paging message by attempting connection establishment with the same RAN node from which the paging request is received. According to embodiments disclosed herein, during a modified paging period, a RAN node may modify paging with respect to certain paging classes during certain paging occasions by interrupting/halting/suspending/modifying paging during the paging occasions (e.g., at least two periods 515 shown in FIG. 5B). Thus, user equipment devices may be configured to monitor and detect potential paging requests corresponding to paging classes for which the RAN node has modified paging by monitoring paging occasions corresponding to nearby RAN nodes instead. Thus, when an actual paging message is detected from a second RAN node during a paging occasion with respect to which a first RAN node has implemented a modified paging policy, the user equipment may attempt connection establishment with the originally-selected first RAN node, which did not actually page the user equipment device due to temporary paging halting.

In an embodiment, user equipment 115, shown in FIG. 2, may transmit to RAN node 105A device capability and traffic information 205 indicative of device capability, applications being executed thereby, subscription level information, or other information that may be indicative of a priority that RAN node 105A may use in determining a paging class to assign to the user equipment or a traffic flow corresponding thereto. RAN node 105A may transmit to user equipment 115 paging class assignment configuration 210 that may comprise one or more paging class identifiers usable by the user equipment to determine whether a paging class configuration 220 or a paging modification indication 230 is indicative of paging configuration information corresponding to paging messages that may be directed to the user equipment. A paging class assignment configuration 210 may comprise a device identifier corresponding to the user equipment or one or more paging class identifiers based on capability and traffic information 205. Configuration information 210 may be semi-static insofar as the device identifier or paging class identifier can be assigned to the user equipment device by a RAN node (e.g., a first-connected RAN node 105A corresponding to a given mobile network operator's wireless communication network) and may be used thereafter, unless changed, to detect future paging indications/messages received from another RAN node (e.g., RAN node 105B) that corresponds to the same network/operator as the configuring RAN node.

WTRU/UE 115 may receive from RAN node 105A paging class configuration 210 that may comprise one or more paging occasion indications, which may indicate paging occasion frequency and timing resources per each radio frame, one or more device or service identifiers indicative of one or more paging classes with respect to which paging indications may be broadcast during the indicated paging occasion(s), periodicity of the paging occasion(s) occurrences, or an indication whether the RAN will accept a connection establishment request transmitted by a user equipment that received a paging message from another RAN node. Thus, certain configured paging resources may be associated with specific services. On condition of determining that a paging class corresponding to user equipment 115 is not present in a paging class configuration 220, or on condition of determining that a paging class corresponding to the user equipment is indicated in a paging modification indication 230 as being interrupted, or halted, the user equipment may temporarily re-select a second available RAN node, such as RAN node 105B, that may support paging with respect to the paging class that RAN 105A has interrupted/deactivated. User equipment 115 may monitor and blindly decode a paging occasion corresponding to a paging class associated with the user equipment via re-selected RAN node 105B.

On condition of absence of a paging indication/message directed by RAN node 105B to UE 115 in a paging occasion indicated as being deactivated/interrupted by RAN node 105A, UE 115 may reselect RAN node 105A. On condition of detecting a paging message 240 broadcast by RAN node 105B that is directed to user equipment 115, according to a paging class for which RAN node 105A has interrupted paging during an indicated paging occasion, and on condition that the user equipment has been configured by configuration 220 or 230 that RAN node 105A may accept new connection establishment with a user equipment paged by another RAN node according to a paging class interrupted during a paging modification period, UE 115 may reselect RAN node 105A and attempt connection establishment and random-access preamble transmission therewith. On condition of detecting a paging message, broadcast by RAN node 105B, corresponding to a paging class interrupted during a paging modification period by RAN 105A, and on condition of being configured via configuration 220 or 230 that RAN node 105A is not accepting new connection establishment user equipment paged by another RAN node according to a paging class and occasion that has been interrupted by RAN 105A, user equipment 115 may attempt connection establishment and random access preamble transmission with RAN 105B even if user equipment 115 determines that a signal strength corresponding to link 125B is not as strong as s signal strength corresponding to link 125A.

Figure 6:
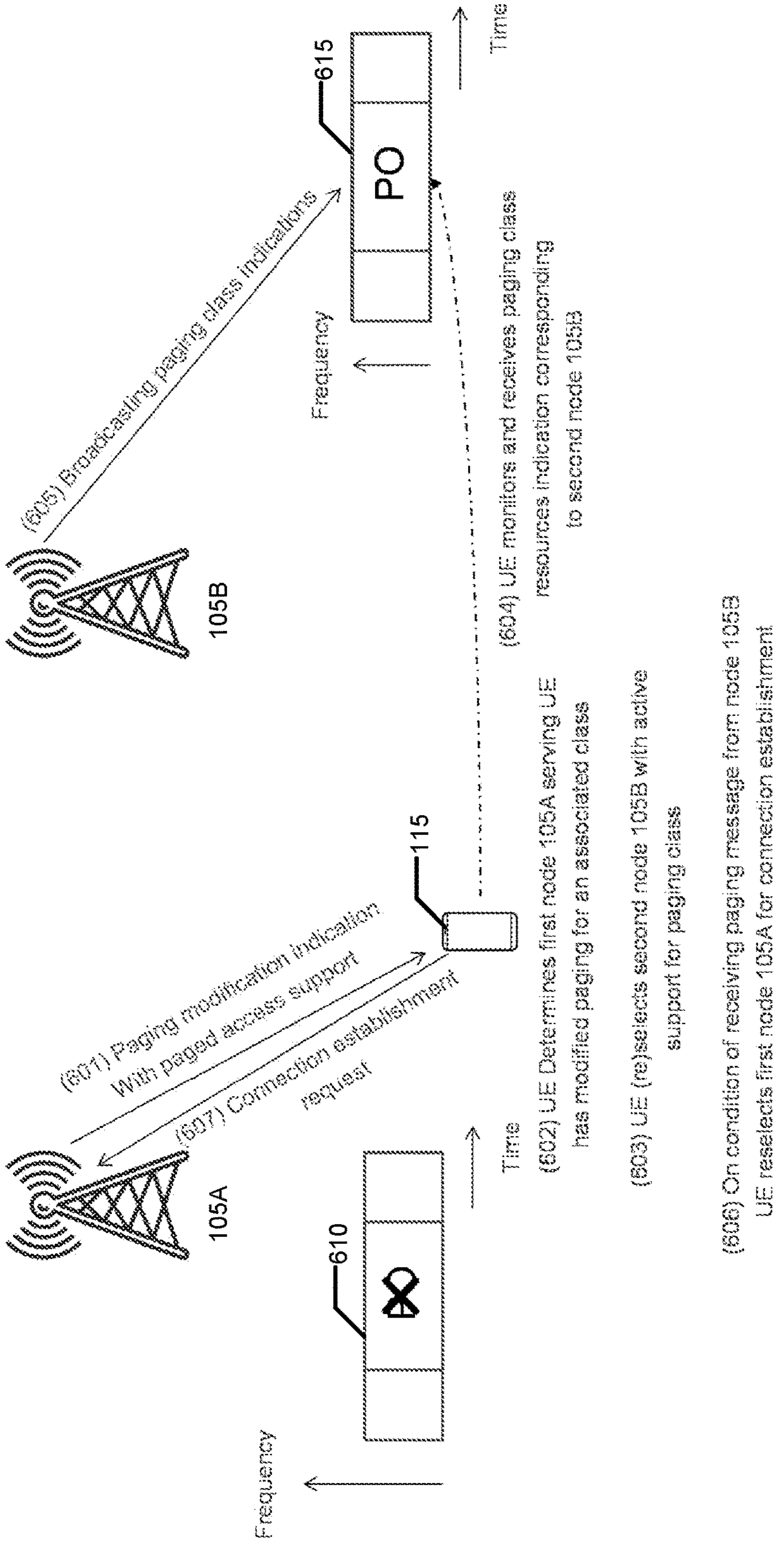
FIG. 6 illustrates an example embodiment wherein a radio node implements a modified paging policy for certain paging classes and supports connection establishment with user equipment associated with the certain paging classes.

In an example shown in FIG. 6, based on user equipment 115 receiving at act 601 a paging class configuration 220 or a paging modification indication 230 (a paging class configuration 220 may be referred to as a paging modification indication), at act 602 the user equipment may determine that radio network node 105A has modified or interrupted paging of a paging class corresponding to the user equipment during paging resource occasion 610 as shown by an 'X' over paging occasion 610. At act 603, user equipment 115 may select, or reselect, radio network 105B. At act 604, user equipment 115 may monitor paging resource occasion 615 corresponding to radio network node 105B. At act 606, user equipment 115 may determine whether a paging message corresponding to a paging class associated with user equipment 115 that radio network node 105A may have interrupted during paging occasion resource 610 is present in paging resource occasion 615. If user equipment 115 determines that paging class configuration 220 in field 320, or paging modification indication 230 in field 415, indicates that radio access network node 105A will accept connection establishment with a user equipment that received a paging message from a different radio access network node, the user equipment may, at act 607 reselect RAN node 105A and perform RRC connection establishment procedures (e.g., attempting connection establishment and performing random-access preamble transmission) with radio network node 105A based on having received a paging message from radio network node 105B.

Figure 7:
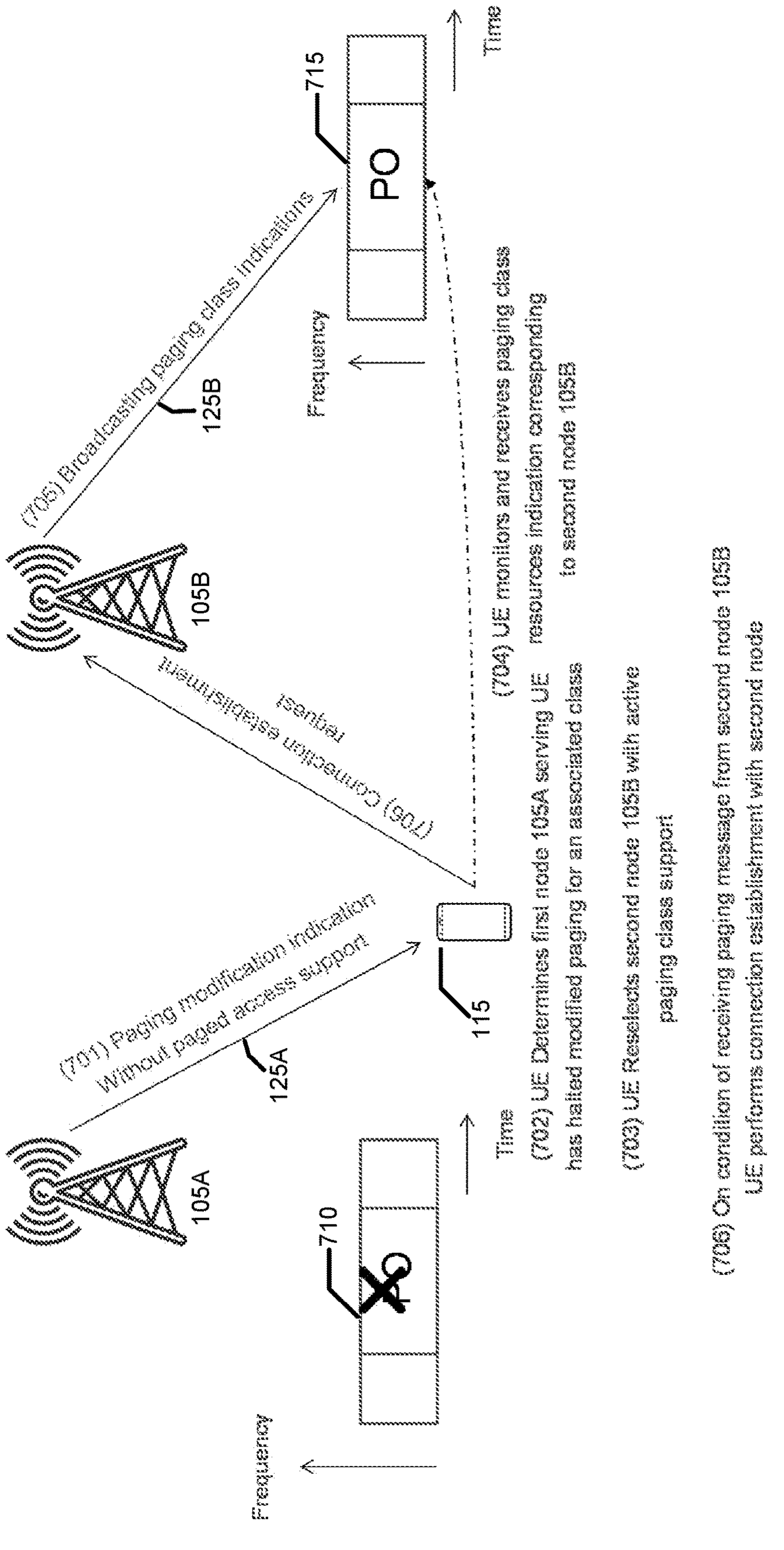
FIG. 7 illustrates an example embodiment wherein a radio node implements a modified paging policy for certain paging classes and does not support connection establishment with user equipment associated with the certain paging classes.

In an embodiment shown in FIG. 7, in contrast to the embodiment illustrated in FIG. 6, if user equipment 115 receives at act 701 configuration information 220 or 230 that indicates that radio access network node 105A will not accept connection establishment with a user equipment based on the user equipment having received, from a different radio access network node, a paging message corresponding to one or more paging classes with respect to which node 105A has halted, interrupted, or otherwise modified paging, and upon determining at act 702 that radio access network node 105A has halted, interrupted, has modified, or is not facilitating, broadcasting of paging messages corresponding to the one or more paging classes associated with the user equipment during paging resource occasion 710, at act 703 the user equipment may select radio access network node 105B. At act 704, user equipment 115 may monitor paging resource occasion 715 corresponding to radio access network node 105B. At act 705, user equipment 115 may determine that radio access network node 105B has broadcast a paging message, during paging occasion 715, corresponding to a paging class that has been interrupted or halted by radio access network node 105A. At act 706, based on receiving a paging message from radio access network node 105B, user equipment 115 may perform connection establishment procedures with radio access network node 105B even if radio link 125B corresponds to a lower, or weaker, signal strength with respect to the user equipment than a signal strength corresponding to radio link 125A with respect to the user equipment.

Figure 8:
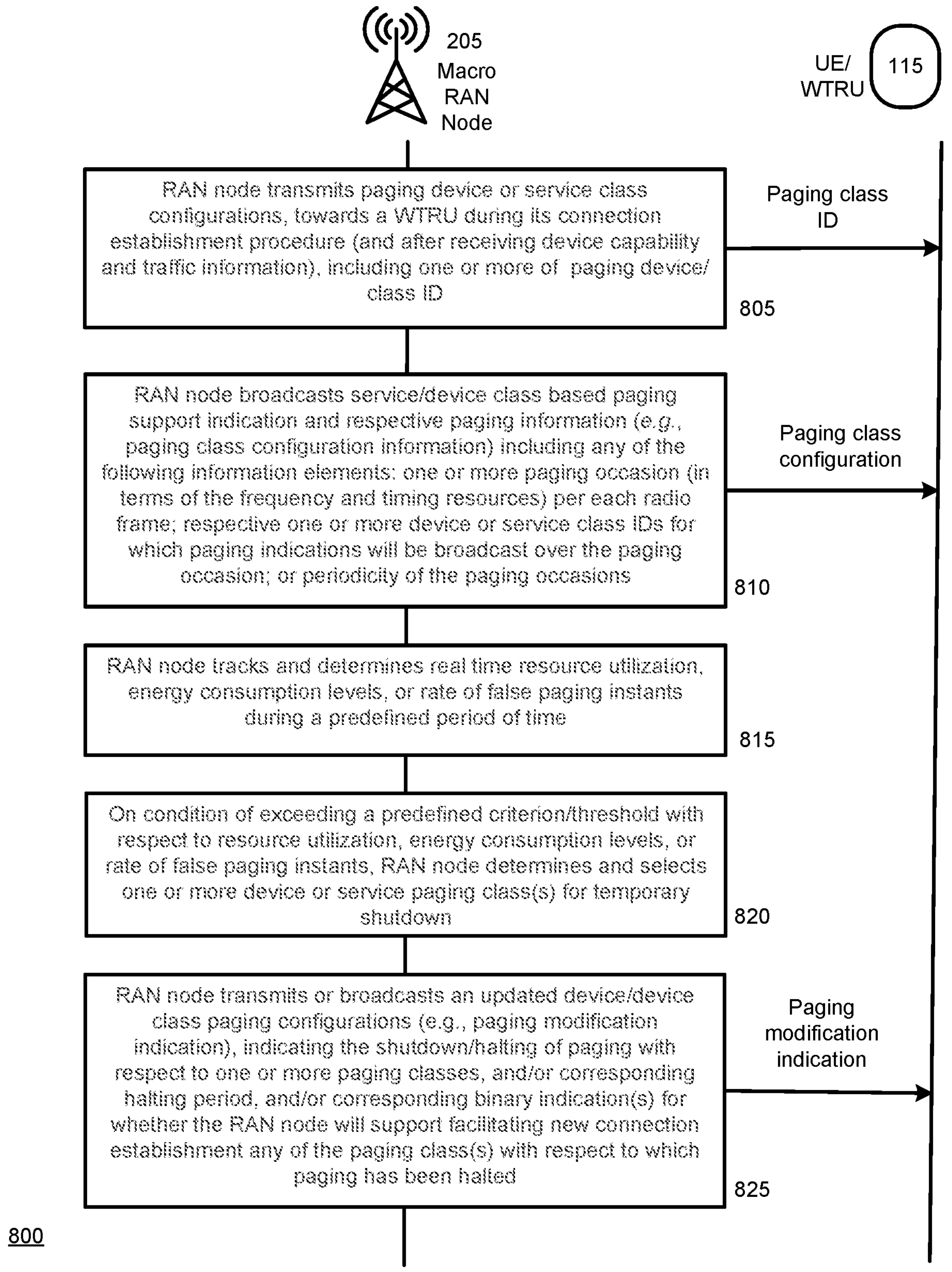
FIG. 8 illustrates a timing diagram of an example method of a radio node facilitating a modified paging policy.

Turning now to FIG. 8, the figure illustrates a timing diagram of an example method 800. At act 805, after receiving device capability and traffic information corresponding to user equipment 115, RAN node 105 may transmit a paging class assignment configuration (e.g., configuration 220) to the user equipment during a connection establishment procedure. Paging class configuration information 220 may comprise one or more paging class identifiers (e.g., identifiers indicative of a device/capability class and/or one or more class identifiers for device paging) corresponding to the user equipment that may be based on device capability or traffic information. At act 810, RAN node 105 may broadcast a service/device-class-based paging support indication, such as paging class configuration 220, which may comprise: one or more paging occasion indications (e.g., in terms of the frequency and timing resources) per each radio frame; one or more device or service class identifiers (e.g., paging class identifiers) for which paging indications will be broadcast during indicated paging resource occasions; or periodicity of the indicated paging occasion(s). At act 815, RAN node 105 may track/monitor and determine one or more paging modification parameter metric(s), for example real-time resource utilization, energy consumption levels, a false paging rate (e.g., rate of paging messages broadcast by RAN node 105 to which a response from a user equipment is not received) during a predefined monitoring period. Based on a monitored paging modification parameter metric exceeding a predefined paging modification parameter threshold/criterion corresponding to resource utilization, energy consumption level, of false paging rate, at act 820 RAN node 105 may determine and select one or more paging class(s) for temporary shutdown. At act 825, RAN node 105 may transmit or broadcast an updated device/device class paging configuration (e.g., a paging modification indication 230) indicative of the shutdown/halting/modification of paging corresponding to one or more paging classes, a corresponding halting/paging modification period, or a corresponding binary indication indicative of whether RAN node 105 may accept new connection establishment requests from user equipment paged by another RAN node during a modified paging period. If RAN node 105 is configured to establish, and has configured user equipment 115 to establish, a connection between the RAN node and the user equipment, based on the user equipment receiving a paging message (from another RAN node) corresponding to one of the paging classes for which paging has been interrupted/halted by RAN node 105, RAN node 105 may receive a connection request and responsive thereto establish a connection with user equipment 115.

Figure 9:
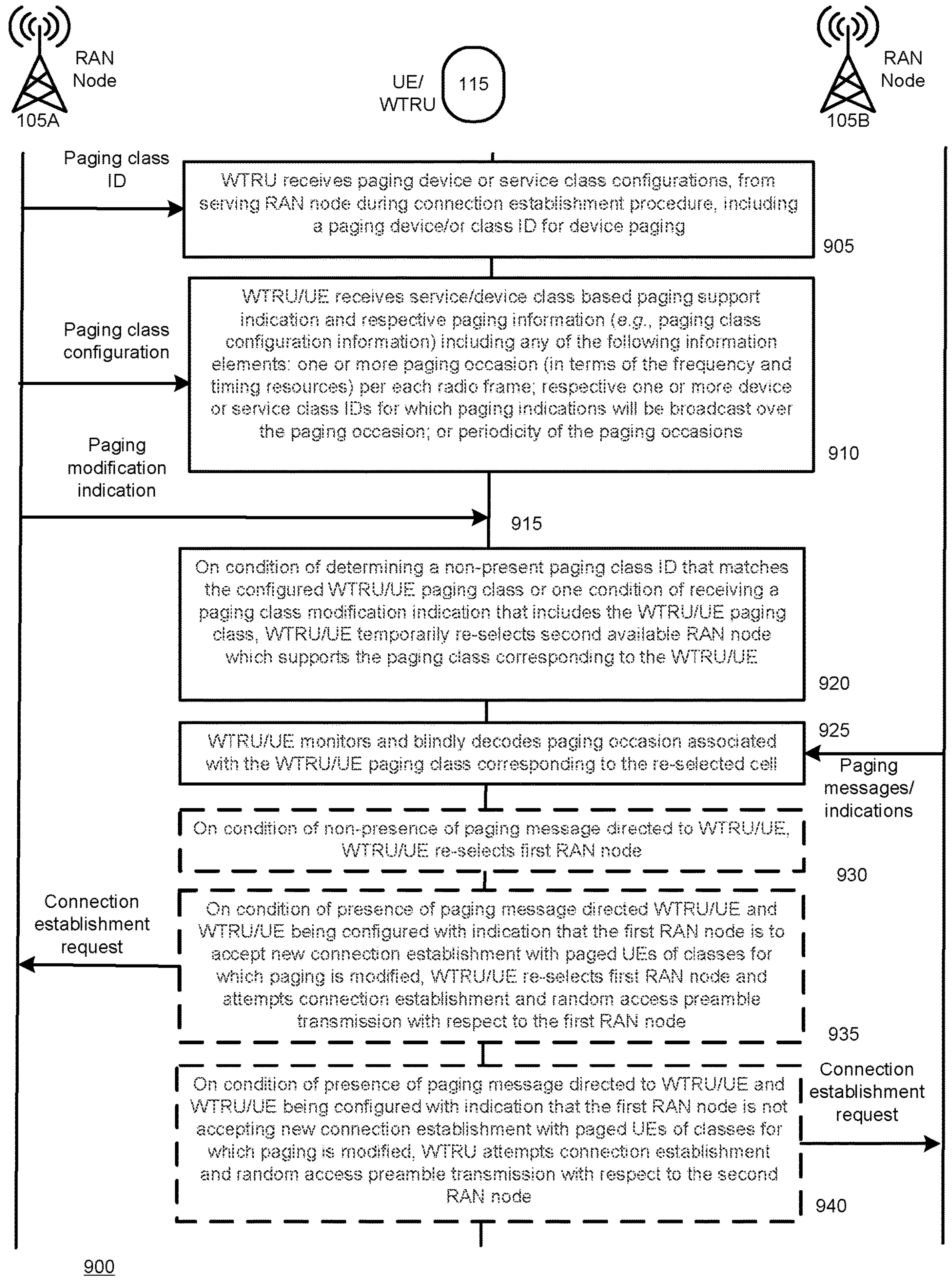
FIG. 9 illustrates a timing diagram of an example method of a user equipment operating during a modified paging policy period.

Turning now to FIG. 9, the figure illustrates a timing diagram of a method 900. At act 905, WTRU/UE 115 may receive from RAN node 105A a paging class assignment configuration that may comprise at least one paging class identifier indictive of at least one paging class associated with the user equipment. At act 910, WTRU/UE 115 may receive, from RAN node 105A, a paging class configuration (e.g., a configuration 220) comprising paging resource monitoring information, corresponding to the at least one paging class associated with the WTRU/UE, and usable by the WTRU/UE to monitor at least one paging resource during at least one modified paging policy period during which RAN node 105A may interrupt, halt, deactivate, or otherwise modify a paging policy with respect to one or more paging classes corresponding to the WTRU/UE. Paging class configuration 220 may comprise one or more paging occasion indication(s), in terms of frequency and timing resources, per each radio frame; one or more paging class identifiers corresponding to which paging indications may be broadcast during an indicated paging occasion; or a periodicity indication indicative of a periodicity of an indicated paging occasion(s).

On condition of determining that a paging class corresponding to user equipment 115 is not present in configuration 220, or on condition of receiving at act 915 a paging interruption indication, such as a configuration 230, indicative that radio network node 105A is implementing a modified paging policy with respect to a paging class corresponding to the user equipment (e.g., a paging class indicated or assigned at act 905), at act 920 user equipment 115 may temporarily re-select available second RAN node 105B that supports paging with respect to the paging class interrupted/deactivated by RAN node 105A. At act 925, WTRU/UE 115 may monitor and blindly decode a paging occasion corresponding to RAN node 105B with respect to a paging class associated with the WTRU/UE.

At act 930, on condition of non-presence, or absence, of a paging indication directed to user equipment 115 during the monitored paging resource occasion corresponding to RAN node 105B, WTRU/UE may re-select first RAN node 105A. On condition of detecting presence of a paging message directed to a paging class corresponding to UE 115 during a paging occasion corresponding to RAN node 105B, and based on UE 115 being configured with an indication that first RAN node 105A is accepting new connection establishment with respect to paged devices that were paged according to a paging occasion corresponding to another RAN node, at act 935 UE 115 may re-select first RAN node 105A and may attempting connection establishment and random access preamble transmission the first RAN node. On condition of determining a presence of a paging message directed to UE 115 during a paging occasion corresponding to RAN node 105B, and based on UE 115 being configured with an indication that RAN node 105A is not accepting new connection establishment with respect to paged devices that were paged according to a paging occasion corresponding to another RAN node, UE 115 may attempt connection establishment and random access preamble transmission with second RAN node 105B, even if a signal strength corresponding to RAN node 105B is weaker, with respect to UE 115, and a signal strength corresponding to RAN node 105A with respect to UE 115. Blocks representing acts 930, 935, and 940 are illustrated with dashed lines to indicate that performance of any of the blocks may be based on whether UE 115 receives a paging message directed to a paging class that is deactivated/interrupted by RAN node 105A, and whether RAN node 105A has indicated to UE 115 that RAN node 105A is accepting connection establishment messages that a user equipment may transmit responsive to receiving a paging message directed to a paging class with respect to which RAN node 105A has temporarily deactivated/halted/interrupted/modified paging according thereto.

Figure 10:
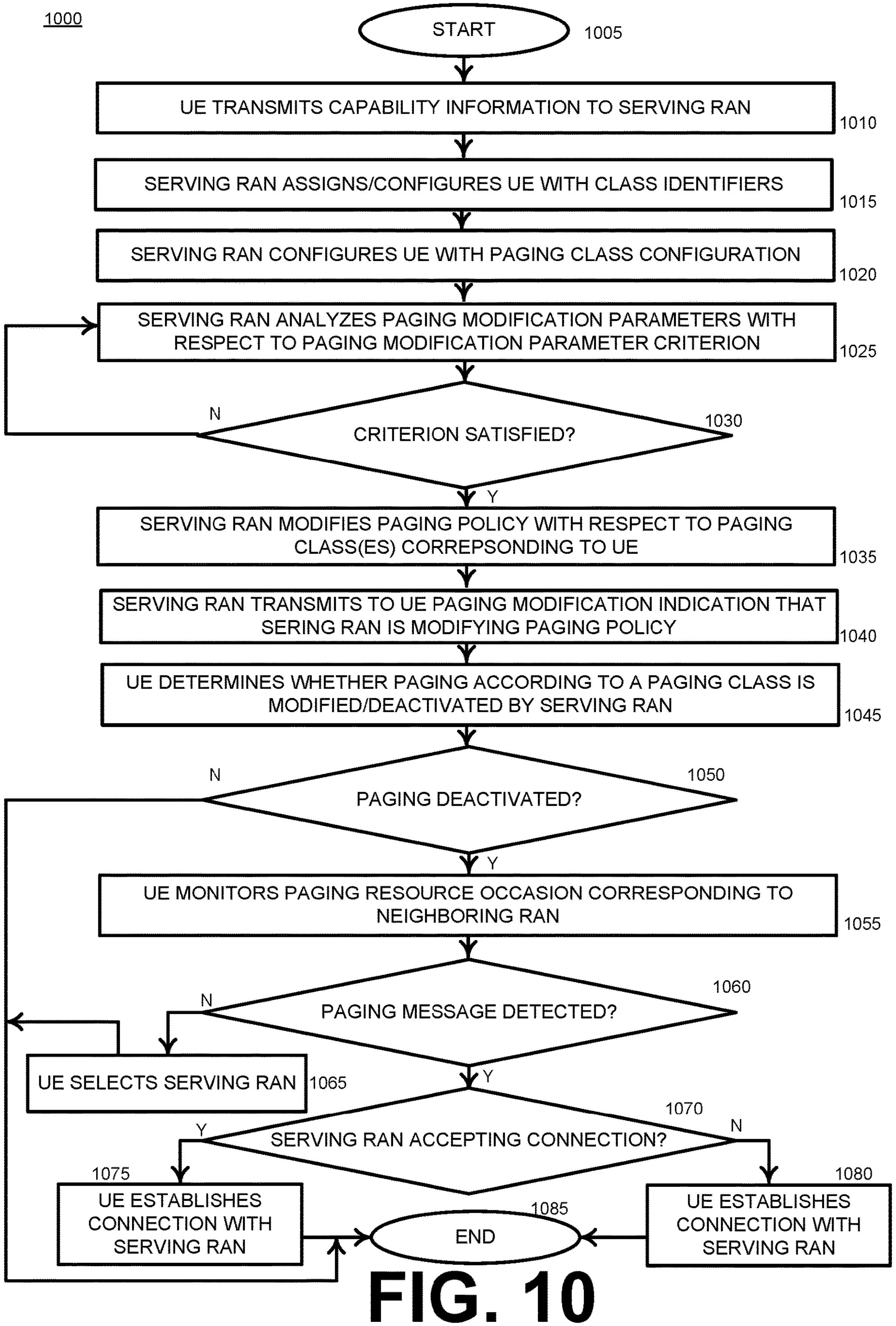
FIG. 10 illustrates a flow diagram of an example method to facilitating a user equipment receiving and responding to paging messages when a serving radio network node implements a modified paging policy.

Turning now to FIG. 10, the figure illustrates a flow diagram of an example method 1000. Method 1000 begins at act 1005. At act 1010, a user equipment may transmit capability information to a serving radio access network node; for example, a user equipment may transmit information 205 described in reference to FIG. 2. At act 1015, responsive to capability information transmitted at act 1010, the serving radio access network node may assign, or configure, the user equipment with one or more class identifiers based on the capability information. At acts 1020, serving radio access network node may configure the user equipment with paging class configuration information, for example paging and class configuration information 220 described in reference to FIG. 2.

At act 1025, the serving radio access network node may monitor and analyze one or more paging modification parameters, for example power consumption, a false paging rate, or a resource utilization with respect to corresponding one or more paging modification parameter criterion/criteria. If a determination is made at act 1030 that the one or more paging modification parameter criterion/criteria are not satisfied, method 1000 may return to act 1025 and the serving radio access network node may continue to analyze paging modification parameters with respect to the paging modification parameter criterion/criteria.

If a determination is made at act 1030 that a paging modification parameter criterion is satisfied, method 1000 may advance to act 1035. At act 1035, the serving radio access network node may modify one or more paging policies with respect to paging classes, indicated, or assigned, at act 1015. At act 1040, the serving radio access network node may transmit to the user equipment a paging modification indication, for example a paging modification indication/configuration 230 described in reference to FIG. 2. Responsive to the paging modification indication transmitted at act 1040, the user equipment may determine whether paging according to a paging class has been modified or deactivated by the serving radio access network node. The user equipment may determine modification or deactivation by the serving radio access network node of a particular paging class based on lack of an indication corresponding to the particular class being included in the configuration transmitted at act 1020 or based on an indication corresponding to the particular class being included in a paging modification indication transmitted at act 1040. At act 1045, the user equipment may determine whether paging according to, or with respect to, a paging class is modified/deactivated by the serving radio access network node. If a determination is made that the serving radio access network node has not deactivated paging according to a particular class corresponding to the user equipment, method 1000 may follow the 'N' path from act 1050 and end at act 1085.

Returning to description of act 1050, if a determination is made that the serving radio access network node has modified or deactivated paging according to a paging class corresponding to the user equipment, method 1000 may advance to act 1055. At act 1055, the user equipment may monitor one or more paging resource occasions corresponding to a radio access network node that is a neighbor to the serving radio access network node. At act 1060, if the user equipment does not determine or detect that a paging message directed to a paging class that has been temporarily deactivated by the serving radio access network node is transmitted by the neighboring radio access network node the user equipment may select, or reselect, the serving radio access network node and method 1000 may advance to act 1085 and end.

Returning to description of act 1060, if the user equipment detects a paging message directed to a paging class corresponding to the user equipment for which the serving radio access network node has deactivated paging, the user equipment may determine at act 1070 whether the serving radio access network node has configured the user equipment with an indication that the serving radio access network node is accepting connection establishment requests from a user equipment to which a paging message, directed to a painting class that the serving radio access network node has deactivated, was transmitted by a radio access network node other than the serving radio access network node. If the user equipment determines that the serving radio access network node is accepting connection establishment requests from a user equipment that received a paging message from another radio access network node, at act 1075 the user equipment may establish a connection with the serving radio access network node and method 1000 advances to act 1085 and ends. If the user equipment determines that the serving radio access network node is not accepting connection establishment requests from a user equipment that received a paging message from another radio access network node, at act 1080 the user equipment may establish a connection with a radio access network node that is a neighbor to the serving radio access network node and method 1000 advances to act 1085 and ends.

Figure 11:
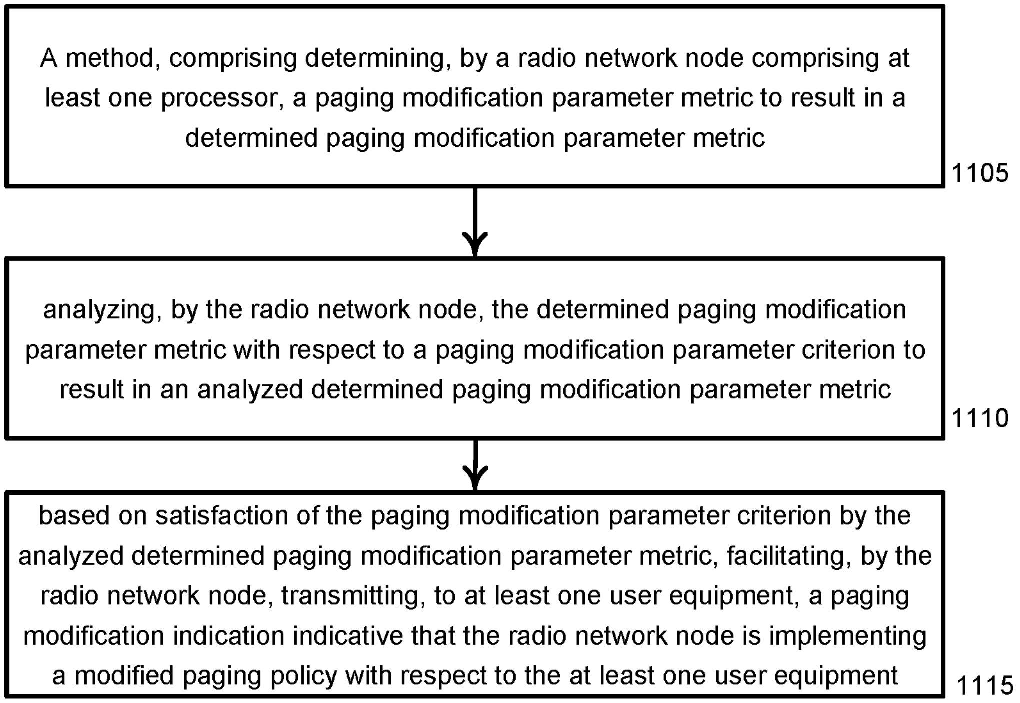
FIG. 11 illustrates a block diagram of an example method.

Turning now to FIG. 11, the figure illustrates an example embodiment method 1100 comprising at block 1105 determining, by a radio network node comprising at least one processor, a paging modification parameter metric to result in a determined paging modification parameter metric; at block 1110 analyzing, by the radio network node, the determined paging modification parameter metric with respect to a paging modification parameter criterion to result in an analyzed determined paging modification parameter metric; and at block 1115 based on satisfaction of the paging modification parameter criterion by the analyzed determined paging modification parameter metric, facilitating, by the radio network node, transmitting, to at least one user equipment, a paging modification indication indicative that the radio network node is implementing a modified paging policy with respect to the at least one user equipment.

Figure 12:
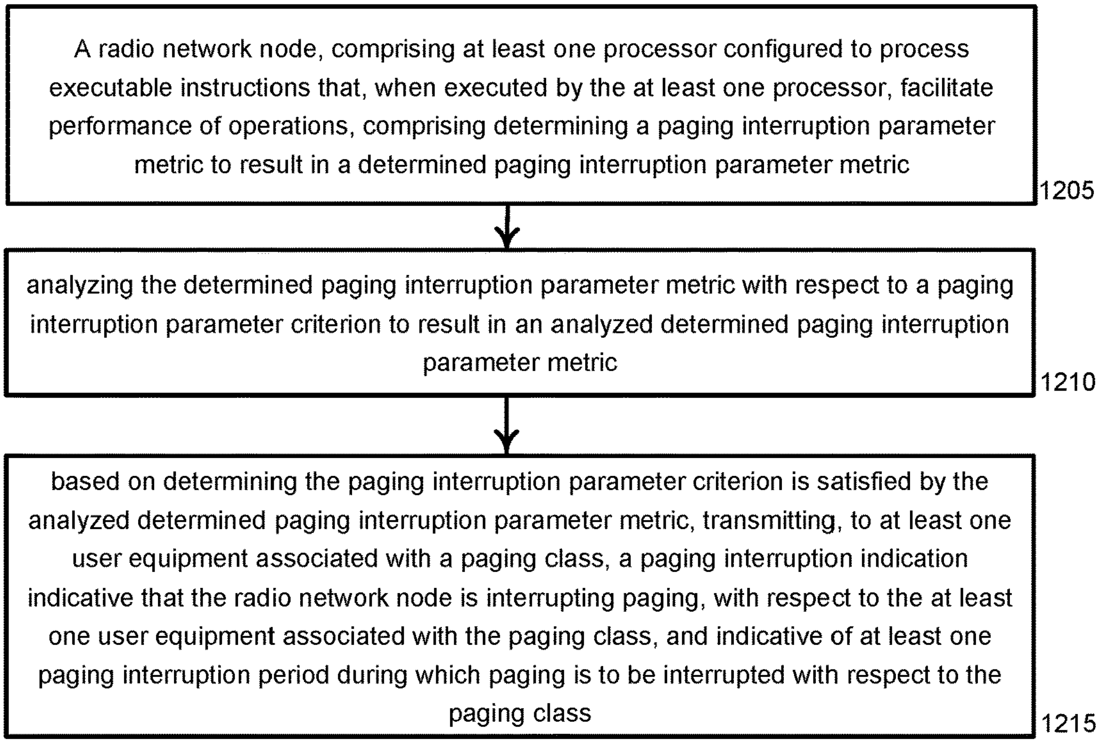
FIG. 12 illustrates a block diagram of an example network node.

Turning now to FIG. 12, the figure illustrates a first radio network node 1200, comprising at block 1205 at least one processor configured to process executable instructions that, when executed by the at least one processor, facilitate performance of operations, comprising determining a paging interruption parameter metric to result in a determined paging interruption parameter metric; at block 1210 analyzing the determined paging interruption parameter metric with respect to a paging interruption parameter criterion to result in an analyzed determined paging interruption parameter metric; and at block 1215 based on determining the paging interruption parameter criterion is satisfied by the analyzed determined paging interruption parameter metric, transmitting, to at least one user equipment associated with a paging class, a paging interruption indication indicative that the radio network node is interrupting paging, with respect to the at least one user equipment associated with the paging class, and indicative of at least one paging interruption period during which paging is to be interrupted with respect to the paging class.

Figure 13:
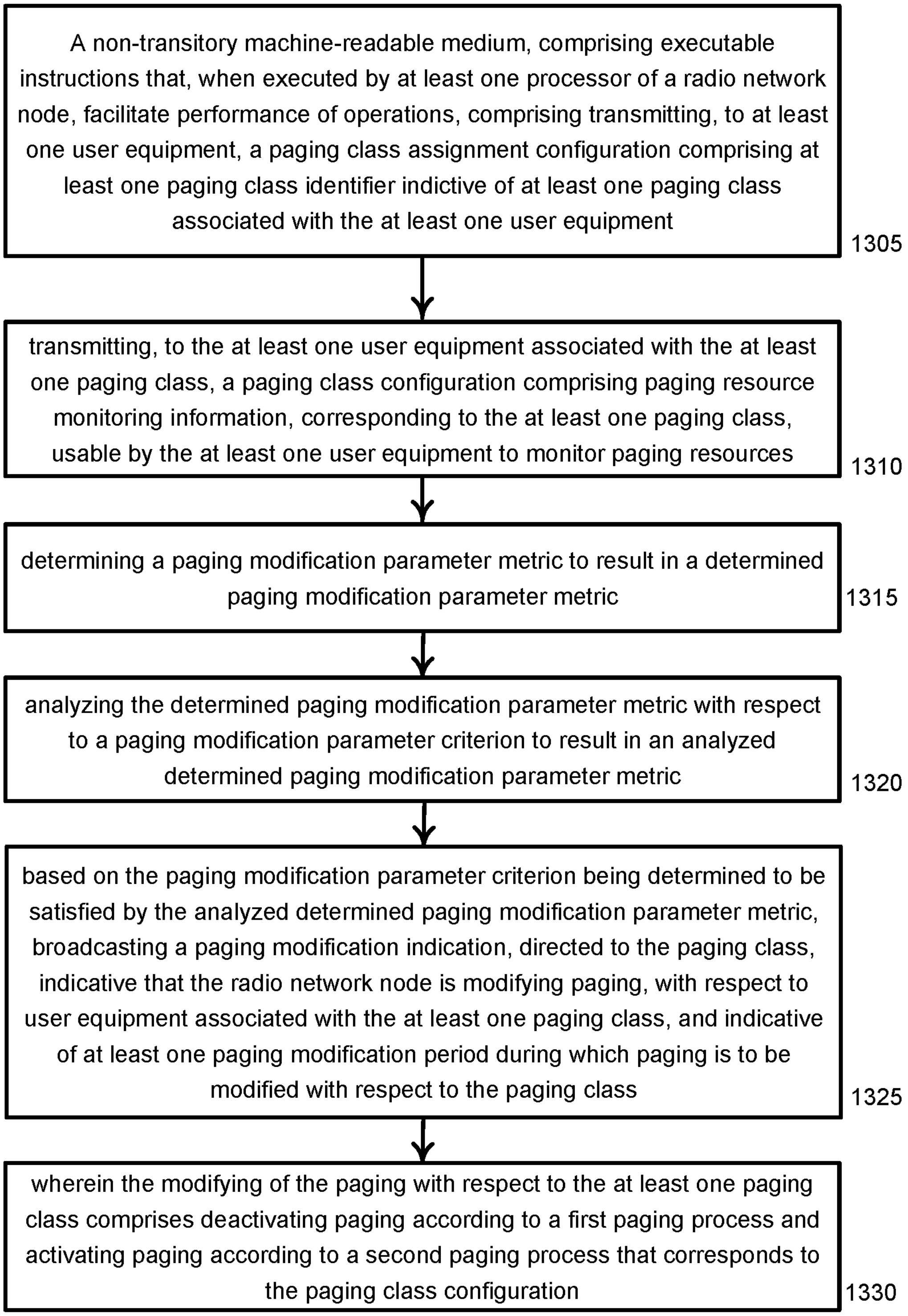
FIG. 13 illustrates a block diagram of an example non-transitory machine-readable medium.

Turning now to FIG. 13, the figure illustrates a non-transitory machine-readable medium 1300 comprising at block 1305 executable instructions that, when executed by at least one processor of a radio network node, facilitate performance of operations, comprising transmitting, to at least one user equipment, a paging class assignment configuration comprising at least one paging class identifier indictive of at least one paging class associated with the at least one user equipment; at block 1310 transmitting, to the at least one user equipment associated with the at least one paging class, a paging class configuration comprising paging resource monitoring information, corresponding to the at least one paging class, usable by the at least one user equipment to monitor paging resources; at block 1315 determining a paging modification parameter metric to result in a determined paging modification parameter metric; at block 1320 analyzing the determined paging modification parameter metric with respect to a paging modification parameter criterion to result in an analyzed determined paging modification parameter metric; at block 1325 based on the paging modification parameter criterion being determined to be satisfied by the analyzed determined paging modification parameter metric, broadcasting a paging modification indication, directed to the paging class, indicative that the radio network node is modifying paging, with respect to user equipment associated with the at least one paging class, and indicative of at least one paging modification period during which paging is to be modified with respect to the paging class; and at block 1330 wherein the modifying of the paging with respect to the at least one paging class comprises deactivating paging according to a first paging process and activating paging according to a second paging process that corresponds to the paging class configuration.

Figure 14:
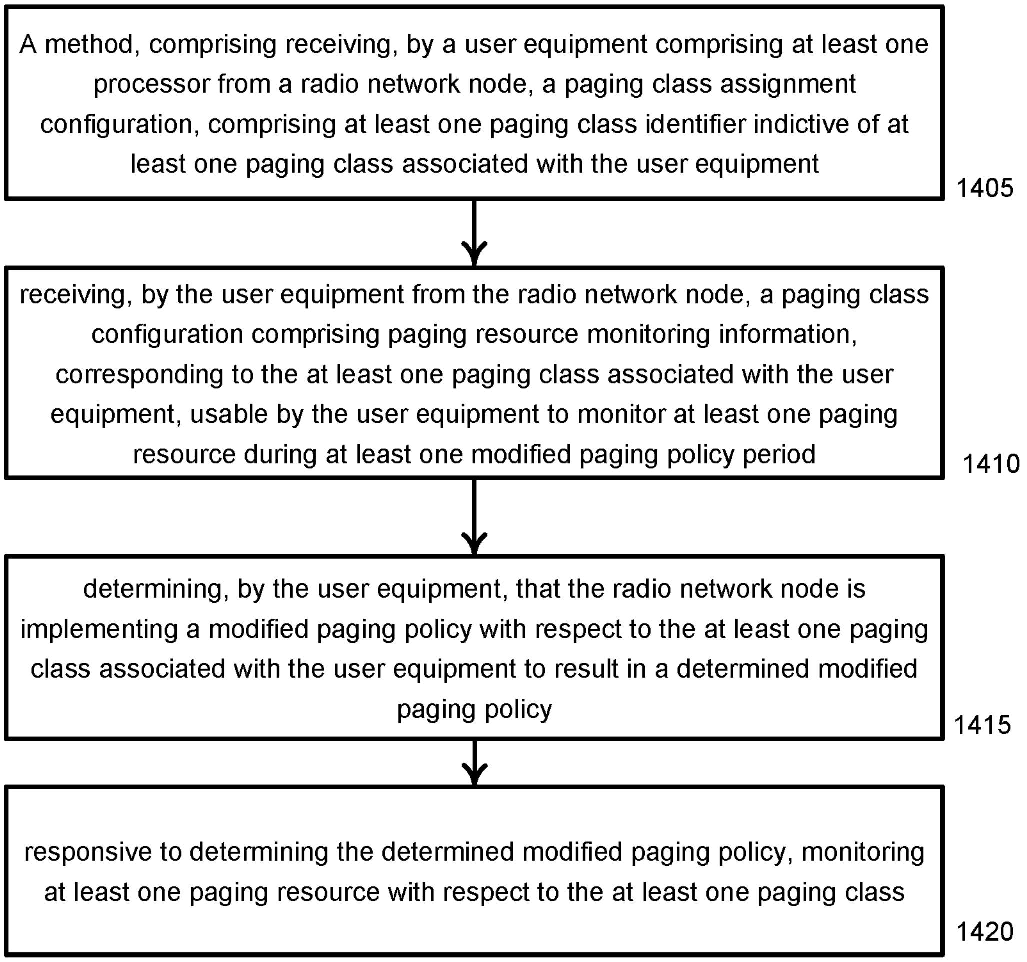
FIG. 14 illustrates a block diagram of an example method.

Turning now to FIG. 14, the figure illustrates an example embodiment method 1400 comprising at block 1405 receiving, by a user equipment comprising at least one processor from a radio network node, a paging class assignment configuration, comprising at least one paging class identifier indictive of at least one paging class associated with the user equipment; at block 1410 receiving, by the user equipment from the radio network node, a paging class configuration comprising paging resource monitoring information, corresponding to the at least one paging class associated with the user equipment, usable by the user equipment to monitor at least one paging resource during at least one modified paging policy period; at block 1415 determining, by the user equipment, that the radio network node is implementing a modified paging policy with respect to the at least one paging class associated with the user equipment to result in a determined modified paging policy; and at block 1420 responsive to determining the determined modified paging policy, monitoring at least one paging resource with respect to the at least one paging class.

Figure 15:
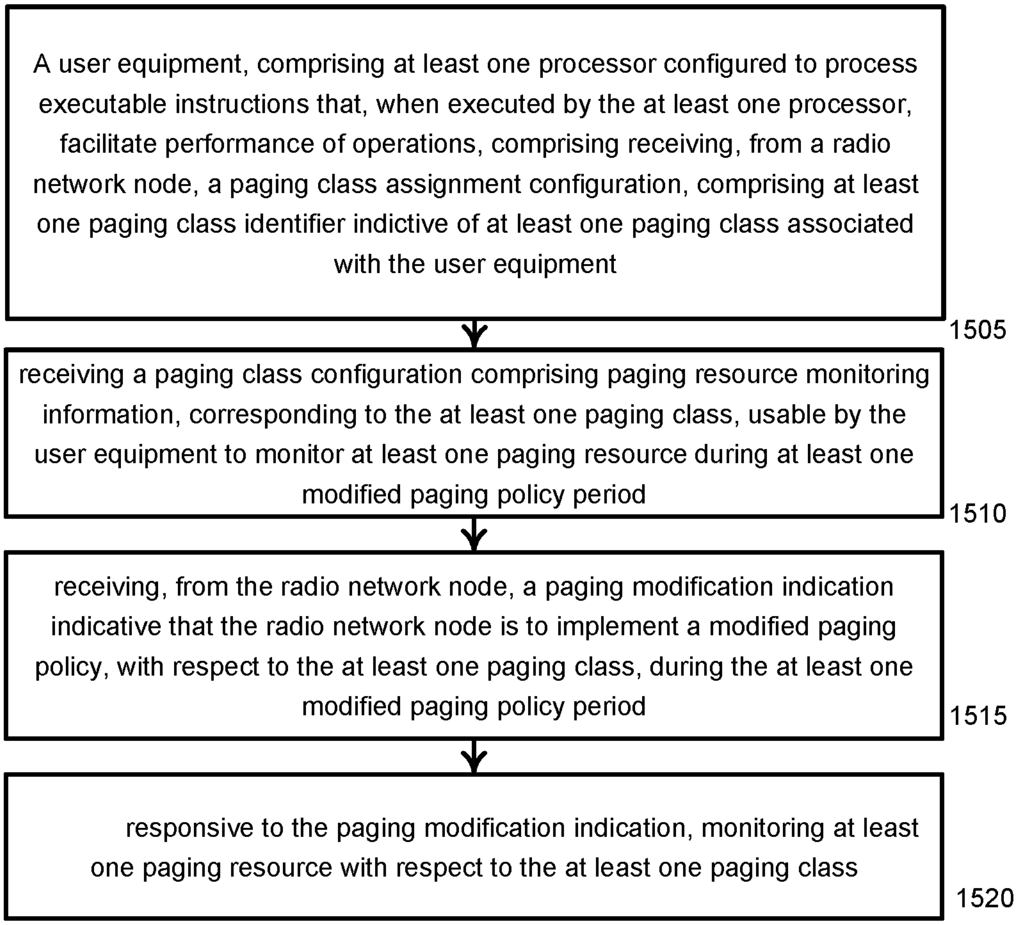
FIG. 15 illustrates a block diagram of an example user equipment.

Turning now to FIG. 15, the figure illustrates an example user equipment 1500, comprising at block 1505 at least one processor configured to process executable instructions that, when executed by the at least one processor, facilitate performance of operations, comprising receiving, from a radio network node, a paging class assignment configuration, comprising at least one paging class identifier indictive of at least one paging class associated with the user equipment; at block 1510 receiving a paging class configuration comprising paging resource monitoring information, corresponding to the at least one paging class, usable by the user equipment to monitor at least one paging resource during at least one modified paging policy period; at block 1515 receiving, from the radio network node, a paging modification indication indicative that the radio network node is to implement a modified paging policy, with respect to the at least one paging class, during the at least one modified paging policy period; and at block 1520 responsive to the paging modification indication, monitoring at least one paging resource with respect to the at least one paging class.

Figure 16:
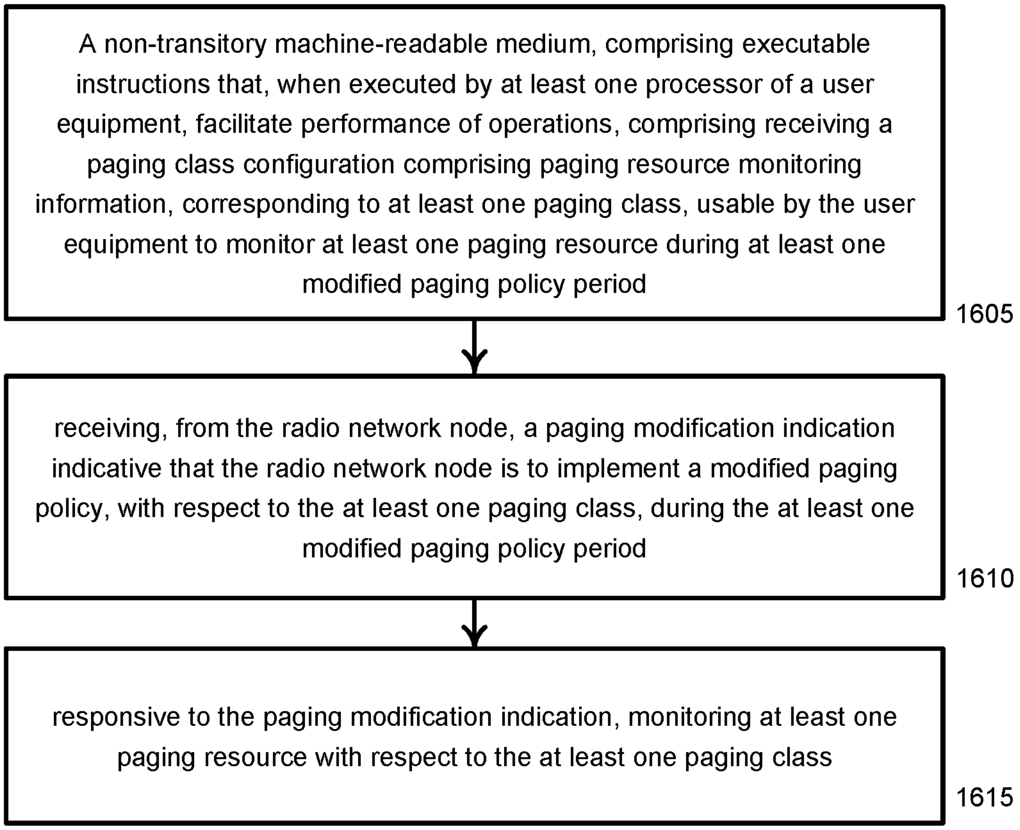
FIG. 16 illustrates a block diagram of an example non-transitory machine-readable medium.

Turning now to FIG. 16, the figure illustrates a non-transitory machine-readable medium 1600 comprising at block 1605 executable instructions that, when executed by at least one processor of a user equipment, facilitate performance of operations, comprising receiving a paging class configuration comprising paging resource monitoring information, corresponding to at least one paging class, usable by the user equipment to monitor at least one paging resource during at least one modified paging policy period; at block 1610 receiving, from the radio network node, a paging modification indication indicative that the radio network node is to implement a modified paging policy, with respect to the at least one paging class, during the at least one modified paging policy period; and at block 1615 responsive to the paging modification indication, monitoring at least one paging resource with respect to the at least one paging class.

Figure 17:
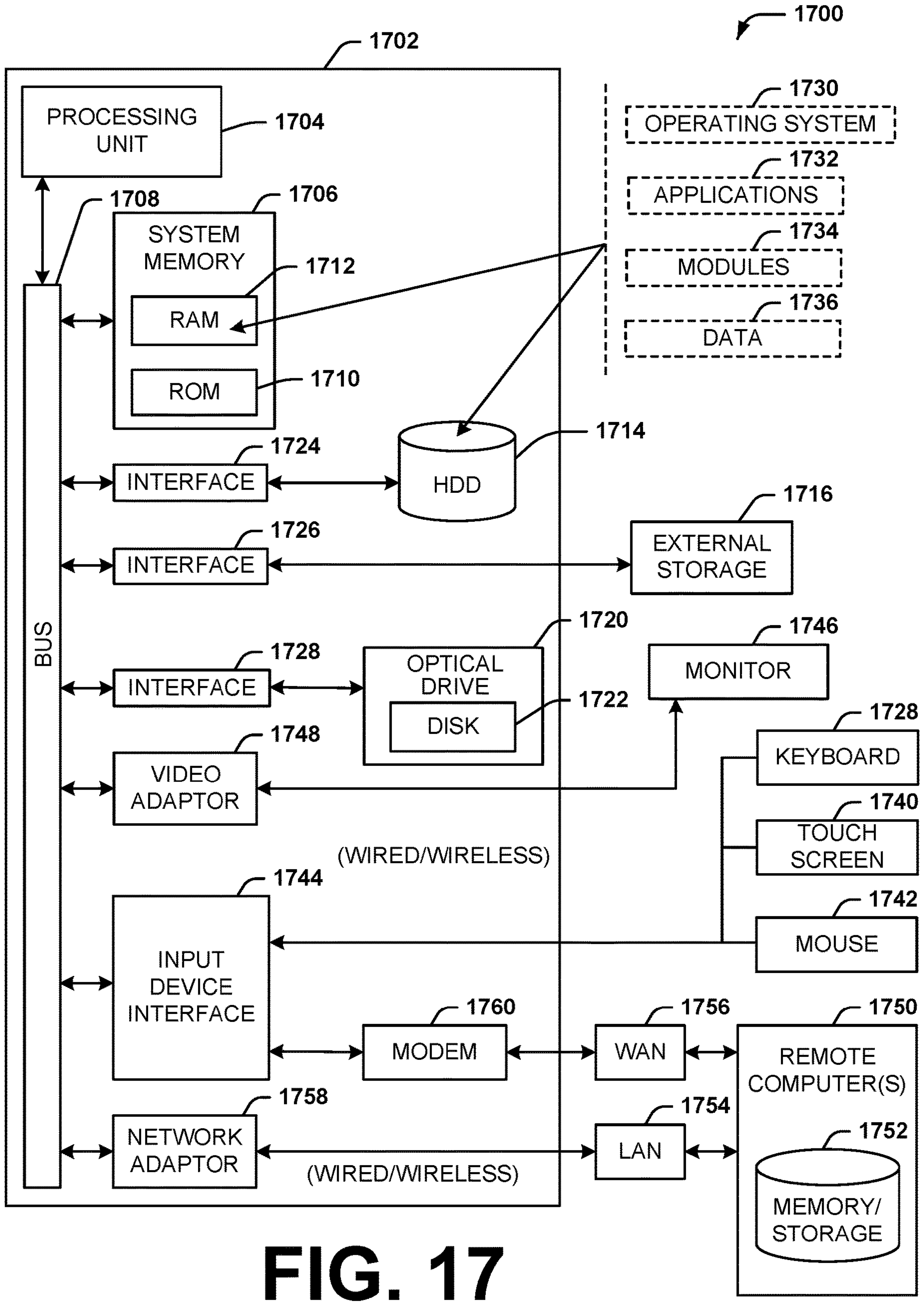
FIG. 17 illustrates an example computer environment.

In order to provide additional context for various embodiments described herein, FIG. 17 and the following discussion are intended to provide a brief, general description of a suitable computing environment 1700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors and may include a cache memory. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

Computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid-state drive (SSD) could be used in addition to, or in place of, an HDD 1714. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can comprise a security module, such as a trusted processing module (TPM). For instance, with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 18:
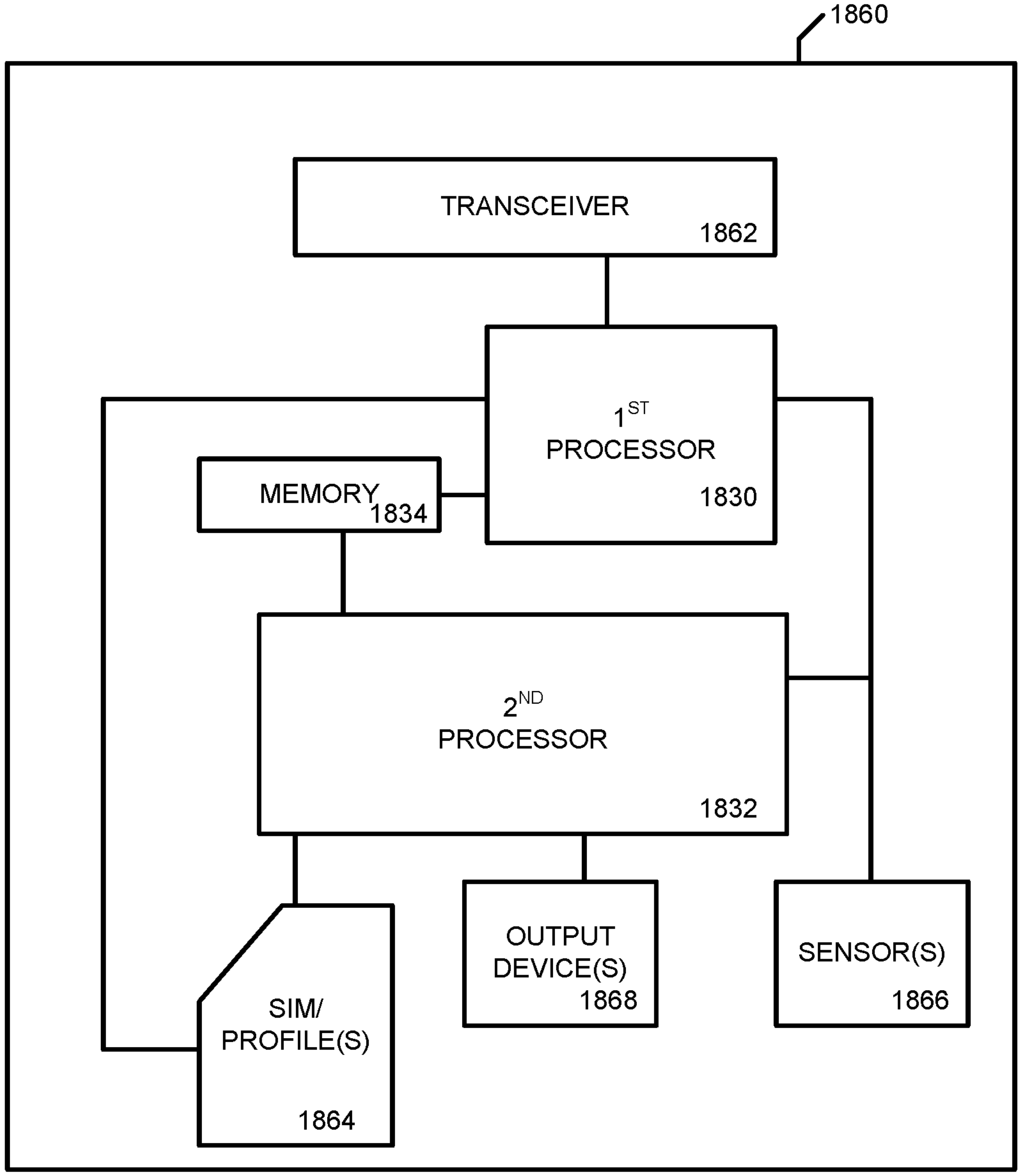
FIG. 18 illustrates a block diagram of an example wireless UE.

Turning to FIG. 18, the figure illustrates a block diagram of an example UE 1860. UE 1860 may comprise a smart phone, a wireless tablet, a laptop computer with wireless capability, a wearable device, a machine device that may facilitate vehicle telematics, a tracking device, remote sensing devices, and the like. UE 1860 comprises a first processor 1830, a second processor 1832, and a shared memory 1834. UE 1860 includes radio front end circuitry 1862, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1862 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 18, UE 1860 may also include a SIM 1864, or a SIM profile, which may comprise information stored in a memory (memory 1834 or a separate memory portion), for facilitating wireless communication with RAN 105 or core network 130 shown in FIG. 1. FIG. 18 shows SIM 1864 as a single component in the shape of a conventional SIM card, but it will be appreciated that SIM 1864 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1864 and another device, which may be a component of RAN 105 or core network 130 shown in FIG. 1). A SIM profile 1864 may also comprise identifying information that is unique to the SIM, or SIM profile, such as, for example, an International Mobile Subscriber Identity ("IMSI") or information that may make up an IMSI.

SIM 1864 is shown coupled to both the first processor portion 1830 and the second processor portion 1832. Such an implementation may provide an advantage that first processor portion 1830 may not need to request or receive information or data from SIM 1864 that second processor 1832 may request, thus eliminating the use of the first processor acting as a 'go-between' when the second processor uses information from the SIM in performing its functions and in executing applications. First processor 1830, which may be a modem processor or a baseband processor, is shown smaller than processor 1832, which may be a more sophisticated application processor, to visually indicate the relative levels of sophistication (e.g., processing capability and performance) and corresponding relative levels of operating power consumption levels between the two processor portions. Keeping the second processor portion 1832 asleep/inactive/in a low power state when UE 1860 does not need it for executing applications and processing data related to an application provides an advantage of reducing power consumption when the UE only needs to use the first processor portion 1830 while in listening mode for monitoring routine configured bearer management and mobility management/maintenance procedures, or for monitoring search spaces that the UE has been configured to monitor while the second processor portion remains inactive/asleep.

UE 1860 may also include sensors 1866, such as, for example, temperature sensors, accelerometers, gyroscopes, barometers, moisture sensors, and the like that may provide signals to the first processor 1830 or second processor 1832. Output devices 1868 may comprise, for example, one or more visual displays (e.g., computer monitors, VR appliances, and the like), acoustic transducers, such as speakers or microphones, vibration components, and the like. Output devices 1868 may comprise software that interfaces with output devices, for example, visual displays, speakers, microphones, touch sensation devices, smell or taste devices, and the like, that are external to UE 1860.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |
| TA | Timing Advance |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

determining, by a first radio network node comprising at least one processor, a paging modification parameter metric to result in a determined paging modification parameter metric;

analyzing, by the first radio network node, the determined paging modification parameter metric with respect to a paging modification parameter criterion to result in an analyzed determined paging modification parameter metric;

based on satisfaction of the paging modification parameter criterion by the analyzed determined paging modification parameter metric, facilitating, by the first radio network node, transmitting, to at least one user equipment, a paging modification indication indicative that the first radio network node is implementing a modified paging policy with respect to the at least one user equipment; and facilitating, by the first radio network node, connection establishment with respect to the at least one user equipment, wherein a connection establishment message, corresponding to the at least one user equipment, is received from a second radio network node.

2. The method of claim 1, wherein the at least one user equipment is part of at least one group of user equipment corresponding to at least one paging class, and wherein the modified paging policy is to be implemented with respect to the at least one user equipment corresponding to the at least one paging class.

3. The method of claim 2, further comprising:

facilitating, by the first radio network node, transmitting, to the at least one user equipment, a paging class configuration comprising paging resource monitoring information, corresponding to the at least one paging class, usable by the at least one user equipment to monitor paging resources with respect to the first radio network node during a modified paging policy period, wherein the paging resource monitoring information comprises at least one of:

at least one paging occasion frequency resource and at least one paging timing resource associated with the at least one paging occasion frequency resource, at least one device class identifier indicative of at least one device classification with respect to which paging messages are able to be broadcast via the at least one paging occasion frequency resource and the at least one paging timing resource, at least one service class identifier indicative of at least one service level classification with respect to which the paging messages are able to be broadcast via the at least one paging occasion frequency resource and the at least one paging timing resource, at least one subscription level identifier indicative of at least one subscription level classification with respect to which the paging messages are able to be broadcast via the at least one paging occasion frequency resource and the at least one paging timing resource, or a periodicity associated with the at least one paging occasion frequency resource or the at least one paging timing resource.

4. The method of claim 2, wherein the at least one user equipment is part of the at least one group of user equipment corresponding to the at least one paging class based on at least one of: a capability corresponding to the at least one user equipment, a services subscription level corresponding to the at least one user equipment, a first quality-of-service associated with the at least one user equipment; or a second quality-of-service associated with the capability corresponding to the at least one user equipment.

5. The method of claim 1, wherein the modified paging policy comprises interruption of paging with respect to the at least one user equipment.

6. The method of claim 1, further comprising:

according to the modified paging policy, avoiding, by the first radio network node, accepting connection establishment with respect to the at least one user equipment.

7. The method of claim 1, further comprising:

facilitating, by the first radio network node, transmitting, via at least one backhaul communication link to a network equipment, a connection establishment indication indicative that the first radio network node has established a connection with the at least one user equipment based on a paging message transmitted by the second radio network node.

8. The method of claim 1, wherein the first radio network node is associated with a first signal strength with respect to the at least one user equipment, and wherein the second radio network node is associated with a second signal strength with respect to the at least one user equipment that is lower than the first signal strength.

9. The method of claim 1, wherein the paging modification parameter metric is at least one of: a resource utilization, an energy consumption, or a false paging rate.

10. The method of claim 1, further comprising:

facilitating, by the first radio network node, receiving, from a network equipment, a paging modification parameter criterion configuration comprising the paging modification parameter criterion.

11. A first radio network node, comprising:

at least one processor configured to process executable instructions that, when executed by the at least one processor, facilitate performance of operations, comprising:

determining a paging interruption parameter metric to result in a determined paging interruption parameter metric;

analyzing the determined paging interruption parameter metric with respect to a paging interruption parameter criterion to result in an analyzed determined paging interruption parameter metric;

based on determining the paging interruption parameter criterion is satisfied by the analyzed determined paging interruption parameter metric, transmitting, to at least one user equipment associated with a paging class, a paging interruption indication indicative that the first radio network node is interrupting paging, with respect to the at least one user equipment associated with the paging class, and indicative of at least one paging interruption period during which paging is to be interrupted with respect to the paging class; and facilitating connection establishment with respect to at least one of the at least one user equipment associated with the paging class, wherein a connection establishment message corresponding to the at least one user equipment of the at least on user equipment associated with the paging class is received from a second radio network node, wherein the at least one of the at least one user equipment associated with the paging class received, from the second radio network node, a paging message during the at least one paging interruption period, and wherein the connection establishment message is responsive to the paging message.

12. The first radio network node of claim 11, wherein the operations further comprise: avoiding, during the at least one paging interruption period, accepting connection establishment with respect to the at least one user equipment associated with the paging class.

13. The first radio network node of claim 12, wherein the operations further comprise:

facilitating transmitting, via at least one backhaul communication link to a network equipment, a connection establishment indication indicative that the first radio network node has established a connection with the at least one user equipment based on the paging message and indicative that paging escalation, with respect to paging the at least one of the at least one user equipment associated with the paging class, is to be halted.

14. The first radio network node of claim 12, wherein the first radio network node is associated with a first signal strength with respect to the at least one user equipment, wherein the second radio network node is associated with a second signal strength with respect to the at least one user equipment, and wherein the second signal strength is lower than the first signal strength.

15. A non-transitory machine-readable medium, comprising executable instructions that, when executed by at least one processor of a first radio network node, facilitate performance of operations, comprising:

transmitting, to at least one user equipment, a paging class assignment configuration comprising at least one paging class identifier indictive of at least one paging class associated with the at least one user equipment;

transmitting, to the at least one user equipment associated with the at least one paging class, a paging class configuration comprising paging resource monitoring information, corresponding to the at least one paging class, usable by the at least one user equipment to monitor paging resources;

determining a paging modification parameter metric to result in a determined paging modification parameter metric;

analyzing the determined paging modification parameter metric with respect to a paging modification parameter criterion to result in an analyzed determined paging modification parameter metric;

based on the paging modification parameter criterion being determined to be satisfied by the analyzed determined paging modification parameter metric, broadcasting a paging modification indication, directed to the paging class, indicative that the first radio network node is modifying paging, with respect to user equipment associated with the at least one paging class, and indicative of at least one paging modification period during which paging is to be modified with respect to the paging class, wherein the modifying of the paging with respect to the at least one paging class comprises deactivating paging according to a first paging process and activating paging according to a second paging process that corresponds to the paging class configuration, wherein the first paging process comprises deactivating paging with respect to the at least one paging class during the at least one paging modification period, wherein the second paging process comprises facilitating connection establishment with respect to the paging class in response to paging messages broadcast by another radio network node, other than the first radio network node, during the at least one paging modification period, and wherein the operations further comprise:

receiving, from a second radio network node, a connection establishment message based on a paging message received by the at least one user equipment from the second radio network node during the at least one paging modification period; and responsive to the connection establishment message, initiating establishment of a communication session with the at least one user equipment.

16. The non-transitory machine-readable medium of claim 15, wherein the paging resource monitoring information comprises at least one of: at least one paging occasion frequency resource and at least one paging timing resource associated with the at least one paging occasion frequency resource, at least one device class identifier indicative of at least one device classification with respect to which paging messages are able to be broadcast via the at least one paging occasion frequency resource and the at least one paging timing resource, at least one service class identifier indicative of at least one service level classification with respect to which the paging messages are able to be broadcast via the at least one paging occasion frequency resource and the at least one paging timing resource, at least one subscription level identifier indicative of at least one subscription level classification with respect to which the paging messages are able to be broadcast via the at least one paging occasion frequency resource and the at least one paging timing resource, a first periodicity associated with the at least one paging occasion frequency resource, or a second periodicity associated with the at least one paging timing resource.

17. The non-transitory machine-readable medium of claim 15, wherein the at least one paging class is based on at least one of: a capability corresponding to the at least one user equipment, a services subscription level corresponding to the at least one user equipment, a first Quality-of-Service associated with the at least one user equipment, or a second Quality-of-Service associated with the capability corresponding to the at least one user equipment.

18. The method of claim 1, wherein the connection establishment facilitated with respect to the at least one user equipment comprises facilitating, with respect to the user equipment, a connection with the second radio access network node.

19. The method of claim 1, wherein the connection establishment facilitated with respect to the at least one user equipment comprises facilitating, with respect to the user equipment, a connection with the first radio access network node.

20. The first radio network node of claim 11, wherein the at least one user equipment being associated with the paging class is based at least on at least one of: a capability corresponding to the at least one user equipment, a services subscription level corresponding to the at least one user equipment, a first quality-of-service associated with the at least one user equipment; or a second quality-of-service associated with the capability corresponding to the at least one user equipment.

* * * * *